US010977934B2

(12) United States Patent
Nishimura et al.

(10) Patent No.: US 10,977,934 B2
(45) Date of Patent: Apr. 13, 2021

(54) INFORMATION PROVIDING SYSTEM, VEHICLE-MOUNTED DEVICE, AND INFORMATION PROVIDING METHOD

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 16/055,939

(22) Filed: Aug. 6, 2018

(65) Prior Publication Data

US 2019/0096237 A1    Mar. 28, 2019

(30) Foreign Application Priority Data

Sep. 25, 2017 (JP) .............................. JP2017-184094

(51) Int. Cl.
| G08G 1/01 | (2006.01) |
| G07C 5/00 | (2006.01) |
| G06K 9/00 | (2006.01) |
| G08G 1/04 | (2006.01) |

(52) U.S. Cl.
CPC ....... *G08G 1/0112* (2013.01); *G06K 9/00785* (2013.01); *G06K 9/00791* (2013.01); *G07C 5/008* (2013.01); *G08G 1/0133* (2013.01); *G08G 1/0141* (2013.01); *G08G 1/04* (2013.01)

(58) Field of Classification Search
None
See application file for complete search history.

(56) References Cited

U.S. PATENT DOCUMENTS

| 9,679,487 B1* | 6/2017 | Hayward ................ G01S 19/50 |
| 2010/0174482 A1* | 7/2010 | Sugawara .............. G01C 21/00 |
| | | 701/517 |
| 2016/0046237 A1 | 2/2016 | Sugimoto et al. |
| 2017/0011270 A1 | 1/2017 | Kamada |

(Continued)

FOREIGN PATENT DOCUMENTS

| JP | 2006113836 A | 4/2006 |
| JP | 2009-008805 A | 1/2009 |

(Continued)

*Primary Examiner* — Jelani A Smith
*Assistant Examiner* — Alexander C. Bost
(74) *Attorney, Agent, or Firm* — Hunton Andrews Kurth LLP

(57) ABSTRACT

An information providing system includes a first information acquisition unit configured to acquire positional information indicating a point at which a first vehicle detects a predetermined event on a road and first vehicle information of the first vehicle acquired by the first vehicle at the point, a second information acquisition unit configured to acquire second vehicle information of a second vehicle at the point, a determination unit configured to determine ease of road traffic at the point as levels using the first vehicle information of the first vehicle and the second vehicle information of the second vehicle at the point, and an information providing unit configured to provide the information on the road indicating ease of the road traffic using a determination result of the determination unit.

14 Claims, 12 Drawing Sheets

(56) References Cited

U.S. PATENT DOCUMENTS

| | | | |
|---|---|---|---|
| 2017/0242436 A1* | 8/2017 | Creusot | G08G 1/005 |
| 2017/0268896 A1* | 9/2017 | Bai | G01C 21/36 |
| 2018/0314259 A1* | 11/2018 | Shami | G08G 1/0112 |
| 2019/0228652 A1* | 7/2019 | Kannappa | G08G 1/0112 |
| 2020/0043254 A1* | 2/2020 | Hase | G07C 5/00 |

FOREIGN PATENT DOCUMENTS

| | | | |
|---|---|---|---|
| JP | 2011-095850 A | 5/2011 | |
| JP | 2011-209809 A | 10/2011 | |
| JP | 2013-171317 A | 9/2013 | |
| JP | 2014010461 A | 1/2014 | |
| JP | 2017-075846 A | 4/2017 | |
| WO | 2014/167701 A1 | 10/2014 | |
| WO | 2015/129045 A1 | 9/2015 | |

\* cited by examiner

FIG. 4A

| POSITION ID | POSITIONAL INFORMATION | VEHICLE INFORMATION | ... |
|---|---|---|---|
| 00010 | - POSITION COORDINATES<br>- ROAD DIVISION<br>- TRAVELING DIRECTION<br>- LANE<br>  THE LIKE | - MAGNITUDE OF SHAKE<br>- VEHICLE SPEED<br>- STEERING ANGLE<br>- ACCELERATION<br>- SIDESLIP<br>  THE LIKE | ... |

| POSITION ID | DATE AND TIME | VEHICLE ID | STATE | VEHICLE INFORMATION | IMAGE DATA | ... |
|---|---|---|---|---|---|---|
| ... | ... | ... | ... | ... | ... | ... |
| 00010 | 1. 2. 20xx 18:30 | xxx01 | NOT PASSABLE | xxxxx | aaa.jpg | ... |
| 00010 | 1. 2. 20xx 18:50 | xxx02 | SHAKE | xxxxx | bbb.jpg | ... |
| 00010 | 1. 2. 20xx 19:10 | xxx03 | DECELERATION NEEDED | xxxxx | ccc.jpg | ... |
| 00010 | 1. 2. 20xx 20:30 | xxx04 | SAFE LANE AVAILABLE | xxxxx | ddd.jpg | ... |
| 00010 | 1. 2. 20xx 20:50 | xxx05 | PASSABLE | xxxxx | eee.jpg | ... |
| ... | ... | ... | ... | ... | ... | ... |

402

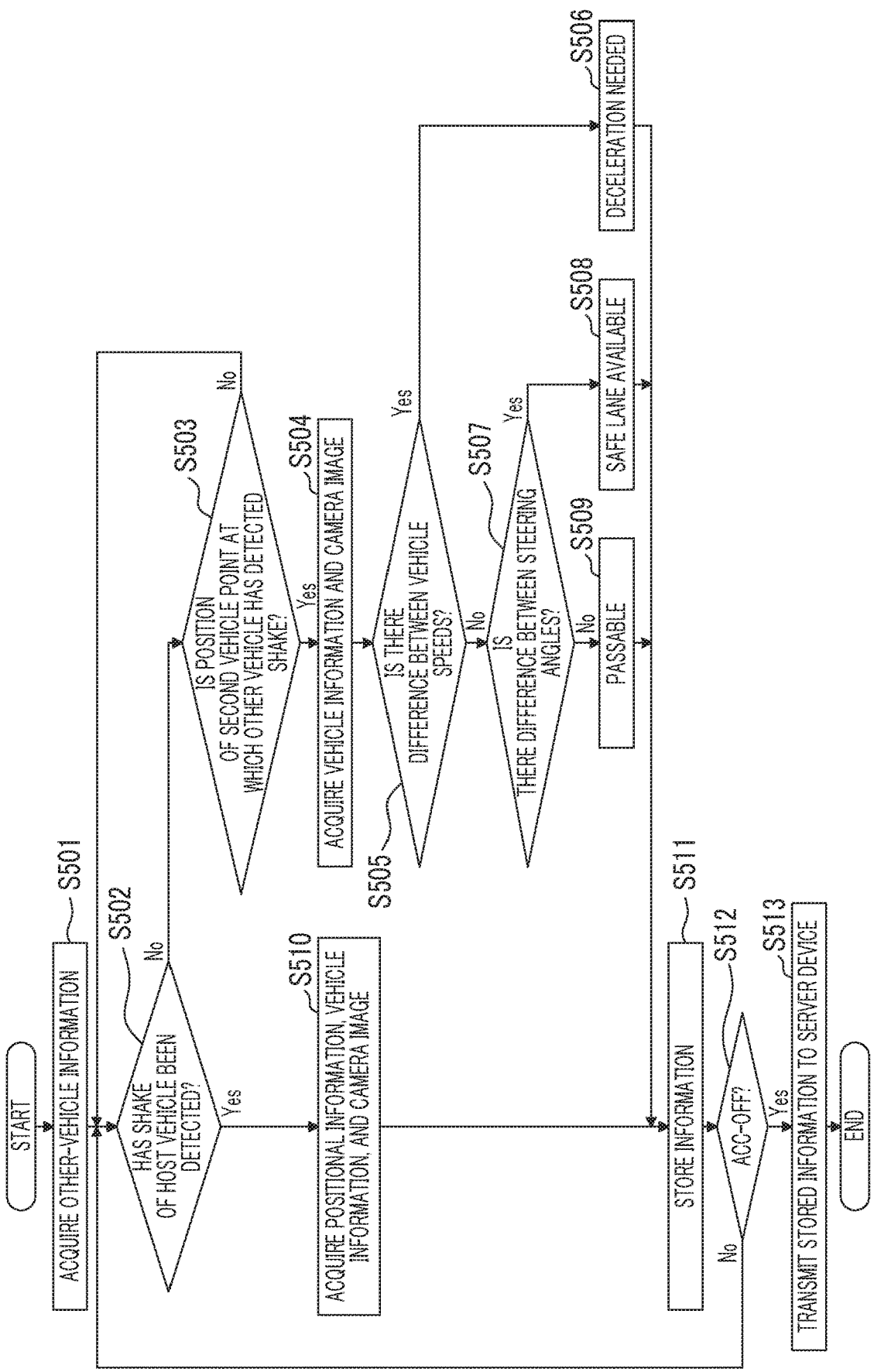

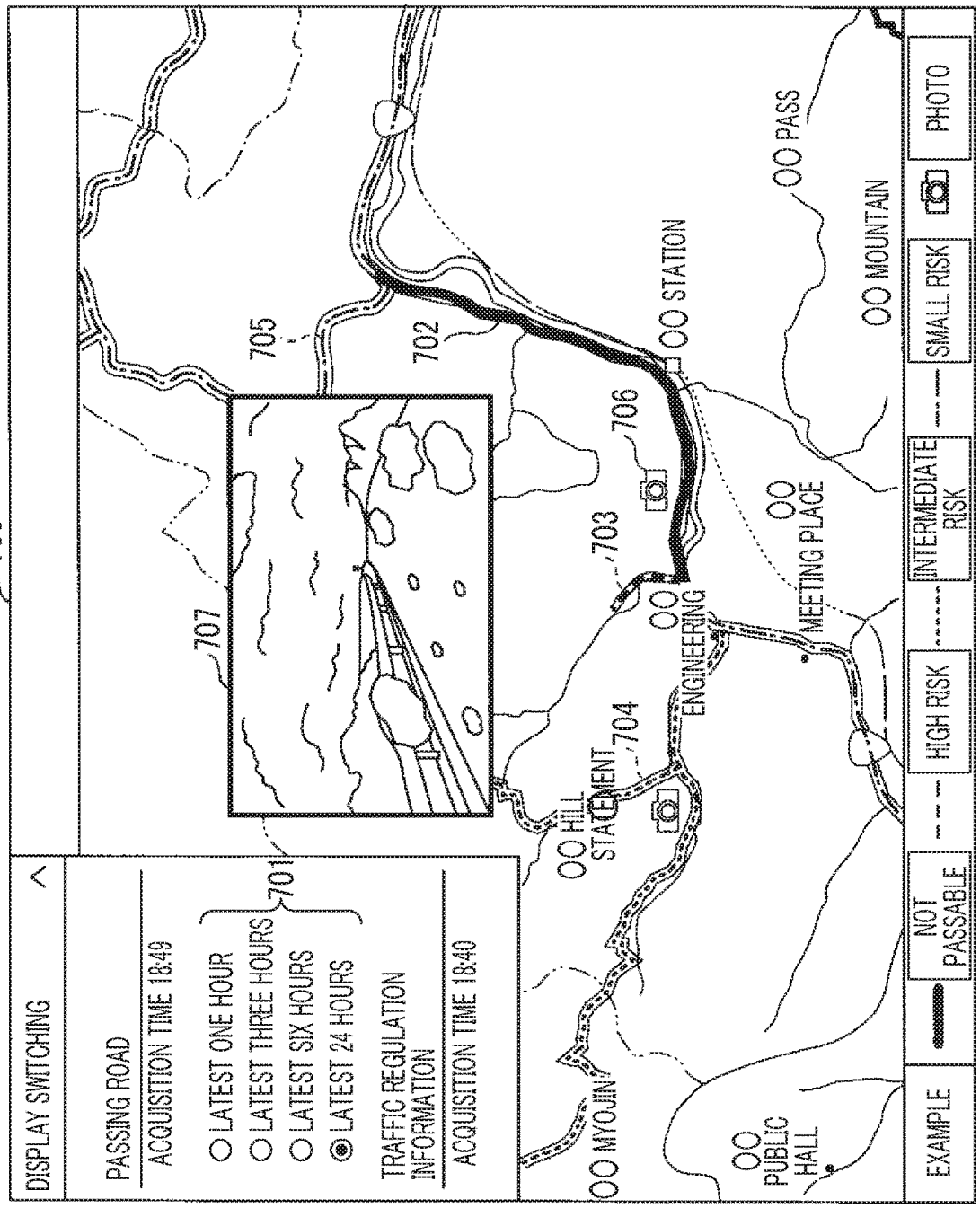

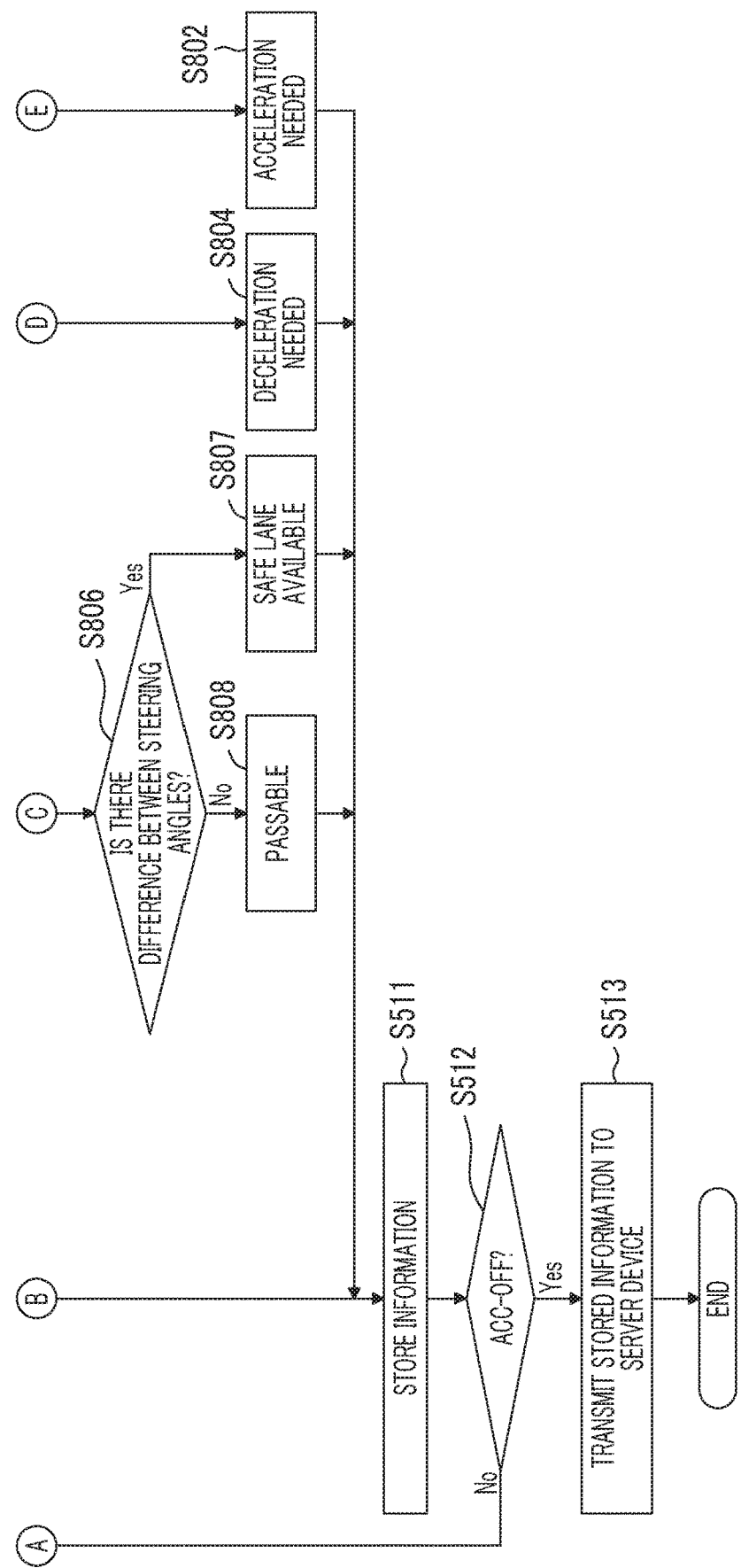

FIG. 11

| POSITION ID | VEHICLE SPEED | STEERING ANGLE | PITCHING | STATE | ... |
|---|---|---|---|---|---|
| ... | ... | ... | ... | ... | ... |
| 00020 | | | | NOT PASSABLE | ... |
| 00020 | | | | NOT PASSABLE | ... |
| 00020 | | | | NOT PASSABLE | ... |
| 00020 | | | O | HIGH RISK | ... |
| 00020 | | | O | HIGH RISK | ... |
| 00020 | U TURN (NO PASSAGE) | | | HIGH RISK | ... |
| 00020 | | O | | INTERMEDIATE RISK | ... |
| 00020 | | | O | INTERMEDIATE RISK | ... |
| 00020 | O | O | | INTERMEDIATE RISK | ... |
| 00020 | | O | | INTERMEDIATE RISK | ... |
| 00020 | | O | | INTERMEDIATE RISK | ... |
| 00020 | O | | | SMALL RISK | ... |
| 00020 | | | | SMALL RISK | ... |
| 00020 | O | | | SMALL RISK | ... |
| ... | ... | ... | ... | ... | ... |

INFORMATION PROVIDING SYSTEM, VEHICLE-MOUNTED DEVICE, AND INFORMATION PROVIDING METHOD

INCORPORATION BY REFERENCE

The disclosure of Japanese Patent Application No. 2017-184094 filed on Sep. 25, 2017 including the specification, drawings and abstract is incorporated herein by reference in its entirety.

BACKGROUND

1. Technical Field

The present disclosure relates to an information providing system, a vehicle-mounted device, and an information providing method.

2. Description of Related Art

An information providing system that collects vehicle information from a vehicle such as an automobile traveling on a road and provides road information using the collected vehicle information is known.

For example, a technology for creating road traffic information obtained by collecting probe data with a vehicle type ID from each of a four-wheeled vehicle and a two-wheeled vehicle, and classifying roads into a road through which a vehicle can pass and a road through which a vehicle cannot pass according to a type of vehicle based on the collected probe data with a vehicle type ID is known (see, for example, Japanese Unexamined Patent Application Publication No. 2011-209809 (JP 2011-209809 A)).

SUMMARY

In the technology disclosed in JP 2011-209809 A, road traffic information is created based on whether or not a vehicle can pass a road. Therefore, for example, even when the vehicle forcibly passes a road damaged due to a disaster or the like, a determination may be made that the road is passable.

As described above, for example, ease of road traffic such as whether or not the vehicle can pass the damaged road or the like without difficulty (or a degree of danger when the vehicle passes through a road) cannot be determined using the information on the road provided in the related art.

An embodiment of the present disclosure provides information on a road from which a user can determine ease of road traffic in an information providing system that provides information on a road using vehicle information acquired by vehicles.

A first aspect of the present disclosure relates to an information providing system including a first information acquisition unit, a second information acquisition unit, a determination unit, and an information providing unit. The first information acquisition unit is configured to acquire positional information indicating a point at which a first vehicle detects a predetermined event on a road and first vehicle information of the first vehicle acquired by the first vehicle at the point. The second information acquisition unit is configured to acquire second vehicle information of a second vehicle at the point. The determination unit is configured to determine ease of road traffic at the point as levels using the first vehicle information of the first vehicle and the second vehicle information of the second vehicle at the point. The information providing unit is configured to provide the information on the road indicating ease of the road traffic using a determination result of the determination unit.

For example, when a vehicle passes through a road damaged due to a disaster or the like, a driver performs a driving operation such as deceleration of a vehicle speed and passing, changing the lane and passing, directly passing, or stopping, and the driving operation is reflected in the vehicle information such as a speed and a steering angle of the vehicle.

The information providing system according to the first aspect of the present disclosure estimates a point at which there is an obstacle on the road according to the positional information of the point at which the first vehicle has detected the predetermined event (for example, a shake of a predetermined value or more). The information providing system determines the ease of passage at the point as levels (for example, safely travelable, safe lane available, and deceleration needed) using the first vehicle information of the first vehicle and the second vehicle information of the second vehicle at the point.

Accordingly, since the information providing system provides the information on the road using the above-described determination result, it is possible to provide information on the road from which the user can determine the ease of road traffic.

The information providing system according to the first aspect of the present disclosure may further include an image acquisition unit configured to acquire an image of the point. The information providing unit may be configured to provide a display screen including map information indicating the ease of the road traffic and the image of the point.

Accordingly, the user of the information providing system can easily determine the ease of road traffic using the map information and confirm a situation of the point through the image.

In the information providing system according to the first aspect of the present disclosure, the predetermined event may include a shake of a predetermined value or more detected by the vehicle, and the first vehicle information and the second vehicle information may include information on a speed and a steering angle of the first vehicle and the second vehicle.

Accordingly, the information providing system can estimate a point at which a shake of a predetermined value or more is detected as a point at which there is an obstacle in the road and recognize a difference between driving operations of a driver using the speed and steering angle of the vehicle.

In the information providing system according to the first aspect of the present disclosure, the second vehicle may include a vehicle mounted device including the first information acquisition unit, the second information acquisition unit, the determination unit, and a transmission unit configured to transmit the information on the point including the second vehicle information at the point and the determination result of the determination unit to an information processing device having the information providing unit.

Accordingly, since the vehicle mounted device includes the determination unit and executes the determination process, it is possible to reduce a load of the determination process of the information processing device including the information providing unit.

In the information providing system according to the first aspect of the present disclosure, the vehicle mounted device may include an image acquisition unit configured to acquire an image of the point, and the information on the point transmitted by the transmission unit may include the image of the point acquired by the image acquisition unit.

Accordingly, the information processing device having the information providing unit can acquire the latest image data of the point and easily update the image of the point included in the information on the road indicating the ease of road traffic provided by the information providing unit.

In the information providing system according to the first aspect of the present disclosure, the determination unit may be configured to determine the ease of the road traffic as levels through a comparison between the first vehicle information and the second vehicle information at the point when the predetermined event is not detected in the second vehicle at the point.

Accordingly, the determination unit can compare the first vehicle information when the predetermined event is detected at the point and the second vehicle information when the predetermined event is not detected at the point and determine the ease of road traffic using the difference between the first vehicle information and the second vehicle information.

In the information providing system according to the first aspect of the present disclosure, the determination unit may be configured to determine the ease of road traffic at the point to be at a first level indicating that safe passage is possible when the predetermined event is not detected in the second vehicle at the point, a difference in a speed between the first vehicle and the second vehicle is smaller than a first threshold value at the point and a difference in a steering angle between the first vehicle and the second vehicle is smaller than a second threshold value at the point.

Accordingly, even when there is no difference between the vehicle speeds and the steering angles included in the first vehicle information and the second vehicle information, the determination unit can determine that an obstacle on the road at the point is eliminated and safe passage is possible at the point since the predetermined event is not detected in the second vehicle.

In the information providing system according to the first aspect of the present disclosure, the determination unit may be configured to determine the ease of road traffic at the point to be at a second level indicating that a safely passable lane is included in the road when the predetermined event is not detected in the second vehicle at the point, a difference in a speed between the first vehicle and the second vehicle is smaller than a first threshold value at the point and a difference in a steering angle between the first vehicle and the second vehicle is equal to or greater than a second threshold value at the point.

Accordingly, even when the vehicle speeds included in the first vehicle information and the second vehicle information are not different, the determination unit can determine that the vehicle can safely pass through the point by the steering operation, that is, a safely passable lane is included in the road.

In the information providing system according to the first aspect of the present disclosure, the determination unit may be configured to determine the ease of road traffic at the point to be at a third level indicating that safe passage is possible through deceleration when the predetermined event is not detected in the second vehicle at the point and a difference in a speed between the first vehicle and the second vehicle is equal to or greater than a first threshold value at the point.

Accordingly, when there is a difference between the vehicle speeds included in the first vehicle information and the second vehicle information, the determination unit can determine that a predetermined event is not detected at the point, that is, that safe passage is possible through deceleration at the point.

The information providing system according to the first aspect of the present disclosure may further include an information processing device including the first information acquisition unit; the second information acquisition unit; an information management unit configured to manage the first vehicle information of the first vehicle acquired by the first information acquisition unit and the second vehicle information of the one or more second vehicles acquired by the second information acquisition unit; the determination unit: and the information providing unit. The determination unit may be configured to determine the ease of the road traffic at the point as levels using the first vehicle information and the second vehicle information managed by the information management unit.

Accordingly, since the information processing device includes the determination unit and executes the determination process, it is possible to reduce a load on the second vehicle. Since the determination unit of the information processing device can determine the ease of road traffic using one or more pieces of second vehicle information, it is possible to perform more appropriate determination.

In the information providing system according to the first aspect of the present disclosure, the first vehicle information and the second vehicle information may include detection results of the predetermined event. The determination unit may be configured to determine the ease of the road traffic at the point to be at a first level when there are vehicles having passed through the point and a vehicle that does not detect the predetermined event is not included among the vehicles having passed the point.

Accordingly, the determination unit of the information processing device can determine that the predetermined event is detected through passing through the point, since all the vehicles passing through the point are detecting the predetermined event. In this case, the determination unit of the information processing device can determine the ease of road traffic at the point to be at the first level having a relatively high risk.

In the information providing system according to the first aspect of the present disclosure, the determination unit may be configured to determine the ease of the road traffic at the point to be a second level at which passage is easier than at the first level when a vehicle that does not detect the predetermined event is included among the vehicles having passed the point, and the second vehicle information indicating a steering angle of which a difference from a steering angle of the first vehicle is equal to or greater than a threshold value is included among the second vehicle information.

Accordingly, the determination unit of the information processing device can determine that the predetermined event can be avoided through the steering operation since the vehicle having performed the steering operation at the point among the vehicles having passed through the point does not detect the predetermined event. In this case, the determination unit of the information processing device can determine the ease of road traffic at the point to be at the second level with a smaller risk than the first level.

In the information providing system according to the first aspect of the present disclosure, the determination unit may be configured to determine the ease of the road traffic at the point to be a third level at which passage is easier than at the first level and the second level when a vehicle that does not detect the predetermined event is included among the vehicles having passed the point, and the second vehicle information indicating a steering angle of which a difference from a steering angle of the first vehicle is equal to or greater than a threshold value is not included among the second vehicle information.

Accordingly, the determination unit of the information processing device can determine that the vehicle can safely pass through the point without performing a special operation since the vehicle having passed the point does not detect the predetermined event when the steering operation is not performed. In this case, the determination unit of the information processing device can determine the ease of road traffic at the point to be at the third level with a lower risk than the first level and the second level.

In the information providing system according to the first aspect of the present disclosure, the determination unit may be configured to determine that the road is not passable at the point when the vehicle information of the vehicle having passed the point is not included in the first vehicle information and the second vehicle information managed by the information management unit.

Accordingly, the determination unit of the information processing device can more correctly determine that the point is not passable.

A second aspect of the present disclosure relates to a vehicle-mounted device including a first information acquisition unit, a second information acquisition unit, a determination unit, and a transmission unit. The first information acquisition unit is configured to acquire positional information indicating a point at which another vehicle different from a host vehicle detects a predetermined event on a road and first vehicle information of the other vehicle acquired by the other vehicle at the point. The second information acquisition unit is configured to acquire second vehicle information of the host vehicle at the point. The determination unit is configured to determine ease of road traffic at the point as levels using the first vehicle information of the other vehicle and the second vehicle information of the host vehicle at the point. The transmission unit is configured to transmit information on the point including the second vehicle information at the point and a determination result of the determination unit to an information processing device that provides information on the road indicating the ease of the road traffic using the determination result.

A third aspect of the present disclosure relates to an information providing method. The information providing method includes acquiring, by a computer, positional information indicating a point at which a first vehicle detects a predetermined event on a road and first vehicle information of the first vehicle acquired by the first vehicle at the point; acquiring, by the computer, second vehicle information of a second vehicle at the point; determining, by the computer, ease of road traffic at the point as levels using the first vehicle information of the first vehicle and the second vehicle information of the second vehicle at the point; and providing, by the computer, the information on the road indicating ease of the road traffic using a determination result in the determining.

According to the aspects of the present disclosure, it is possible to provide information on a road from which a user can determine ease of road traffic in an information providing system that provides information on a road using vehicle information acquired by vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A illustrates a table showing an image of information managed by the information providing system according to the first embodiment;

FIG. 4B illustrates a table showing an image of information managed by the information providing system according to the first embodiment;

FIG. 5 is a flowchart illustrating an example of a process of a vehicle-mounted device according to the first embodiment;

FIG. 7 is a diagram illustrating an example of a display screen provided by an information providing unit according to an embodiment;

FIG. 8B is a flowchart illustrating an example of a process of the vehicle-mounted device according to a second embodiment;

FIG. 11 is a table showing an image of a determination result of a determination unit according to a third embodiment.

DETAILED DESCRIPTION OF EMBODIMENTS

Hereinafter, modes for carrying out the disclosure will be described with reference to the drawings.

System Configuration

Figure 1:
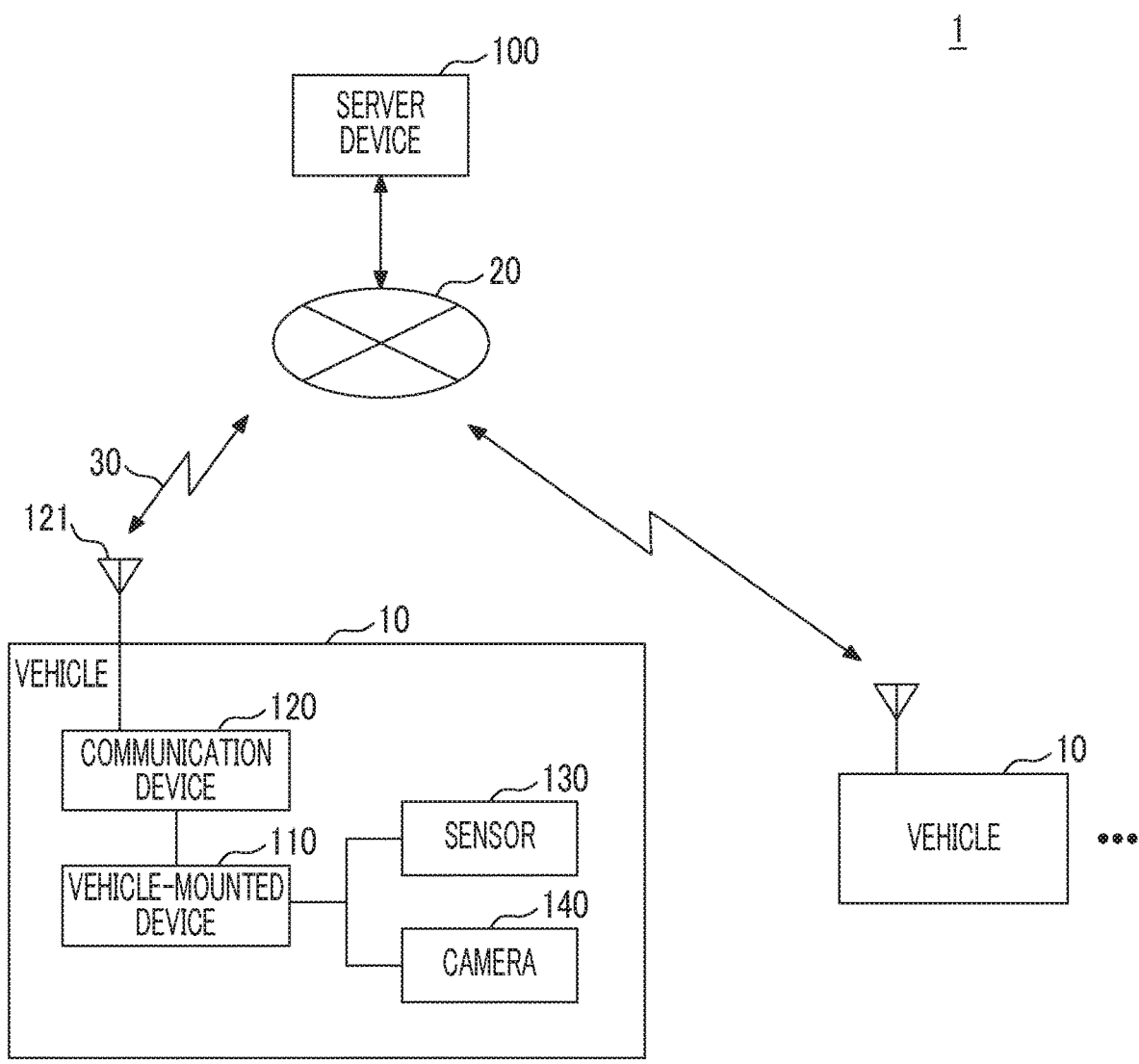
FIG. 1 is a diagram illustrating an example of a system configuration of an information providing system according to an embodiment.

FIG. 1 is a diagram illustrating an example of a system configuration of an information providing system according to an embodiment. The information providing system 1 collects vehicle information (for example, information such as a vehicle speed, a steering angle, or shake) that is collected by a vehicle 10 such as an automobile and provides information on a road (for example, map information indicating ease of road traffic) using the collected vehicle information.

The information providing system 1 includes a server device 100 connected to a communication network 20, a vehicle-mounted device 110 mounted on each of one or more vehicles 10 and connectable to the communication network 20 using a communication device 120. The communication device 120 is a device for connecting to the communication network 20 through wireless communication, and is realized by, for example, a data communication module (DCM) or the like.

The vehicle-mounted device 110 is, for example, an information device such as a car navigation device or an information processing device such as a vehicle-mounted electric control unit (ECU) that is mounted on a vehicle. The vehicle-mounted device 110 acquires vehicle information such as a vehicle speed, a steering angle, or a shake of the vehicle 10 detected by a sensor 130 mounted on the vehicle 10 from the sensor 130 or a vehicle control ECU that controls the vehicle. The vehicle-mounted device 110 acquires image data obtained by imaging the periphery of the vehicle 10 using a camera 140.

With the above-described configuration, when the sensor 130 detects, for example, a shake of a predetermined value or more while a vehicle is traveling on the road, the vehicle-mounted device 110 transmits information on the point including positional information of a point at which the shake of a predetermined value or more is detected and the vehicle information acquired at the point, to the server device 100.

The predetermined value, for example, is assumed to be a predetermined value that is detected when there is an obstacle such as a collapse, a falling rock, or a falling object on a road, and is difficult to detect at the time of normal traveling. Accordingly, the server device 100 can estimate a point at which there is an obstacle in the road based on the positional information on the point at which the shake of a predetermined value or more is detected, which is transmitted from the vehicle 10.

The shake of the predetermined value or more is an example of an event determined in advance to estimate a point at which there is an obstacle on a road. The predetermined event is not limited to the shake of the predetermined value or more, and may be, for example, an event such as a sideslip that is detected based on the vehicle information acquired by the vehicle 10 or an obstacle of the road detected based on the image data captured by the camera 140.

Desirably, the information on the point transmitted by the vehicle-mounted device 110 includes the image data of the point imaged by the camera 140. Accordingly, the server device 100 acquires the image data of the point at which the shake of a predetermined value or more is detected, and for example, the server device 100 can display the image data on a web page or the like that provides information on the road.

The vehicle-mounted device 110 acquires the positional information of the point at which another vehicle has detected the shake of a predetermined value or more, and the vehicle information acquired by another vehicle at the point from the server device 100 via the communication device 120.

The vehicle-mounted device 110 determines ease of road traffic at the point as levels using the vehicle information of the host vehicle acquired at the point at which the other vehicle detects the shake of a predetermined value or more and the acquired vehicle information of the other vehicle. For example, the vehicle-mounted device 110 divides the ease of the road traffic at the point into a plurality of levels such as "safely passable", "safe lane available", and "safely passable through deceleration".

The vehicle-mounted device 110 transmits the information on the point including the above-described determination result and the vehicle information of the host vehicle to the server device 100.

Desirably, the information on the point transmitted by the vehicle-mounted device 110 includes the image data of the point imaged by the camera 140. Accordingly, the server device 100 can acquire the latest image data of the point and easily update, for example, the image of the point to be displayed on a web page or the like.

The server device (information processing device) 100 is, for example, an information processing device such as a personal computer (PC) or a system including a plurality of information processing devices.

The server device 100 receives the positional information of the point at which the shake of a predetermined value or more is detected, and the vehicle information acquired by the first vehicle at the point, which are transmitted from a vehicle which has detected the shake of a predetermined value or more during traveling (hereinafter referred to as a first vehicle). The server device 100 notifies another vehicle different from the first vehicle (hereinafter referred to as a second vehicle) of the positional information of the point and the vehicle information of the first vehicle detected at the point. Using the notified information described above, the vehicle-mounted device 110 of the second vehicle transmits the information on the point including the above-described determination result and the vehicle information of the second vehicle at the point to the server device 100.

The server device 100 provides information on roads indicating the ease of the road traffic, for example, using the information on the point transmitted from the second vehicle. For example, the server device 100 provides a web page including map information indicating the ease (or a degree of danger, or the like) of the road traffic and the image of the point to an information processing device or the like including a web browser using the determination result included in the information on the point received from the second vehicle.

As described above, according to this embodiment, in the information providing system 1 that provides road information using the vehicle information acquired by the vehicle 10, it is possible to provide information on the road from which the user can determine the ease of road traffic. The map information indicating the ease of road traffic, the image of the point, and the like are examples of road information from which the ease of road traffic can be determined.

Hardware Configuration

Hardware Configuration of Vehicle-Mounted Device and Server Device

Since the vehicle-mounted device 110 and the server device 100 are information processing devices having a general computer configuration, a hardware configuration of the general computer will be described herein.

Figure 2:
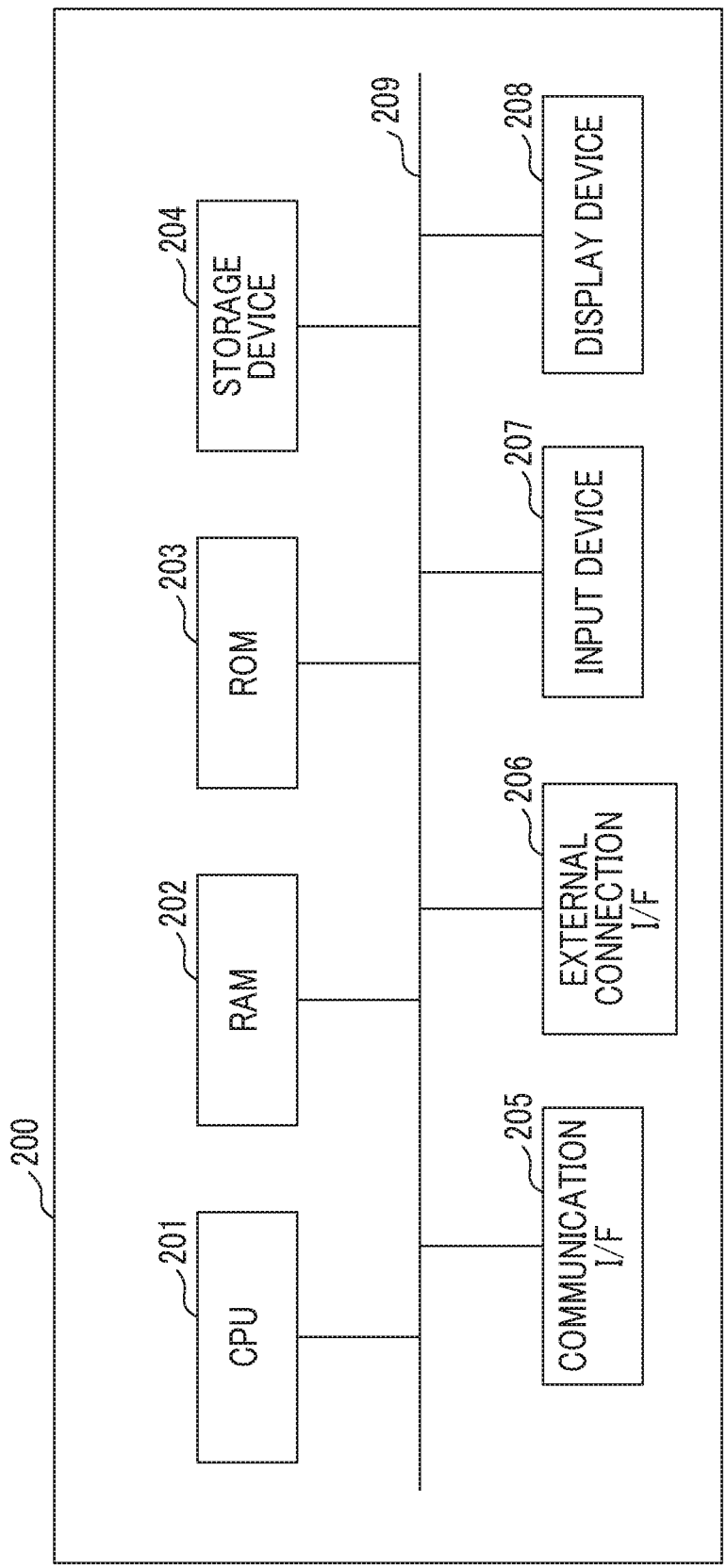
FIG. 2 is a diagram illustrating an example of a hardware configuration of a computer according to an embodiment.

FIG. 2 is a diagram illustrating an example of a hardware configuration of a computer (the vehicle-mounted device 110 or the server device 100) according to an embodiment. The computer 200 includes, for example, a central processing unit (CPU) 201, a random access memory (RAM) 202, a read only memory (ROM) 203, a storage device 204, a communication interface (I/F) 205, an external connection I/F 206, an input device 207, a display device 208, and a system bus 209.

The CPU 201 is an arithmetic device that realizes each function of the computer 200 by reading a program, data, and the like stored in the ROM 203, the storage device 204, or the like onto the RAM 202 and executing a process. The RAM 202 is a volatile memory that is used as a work area or the like of the CPU 201. The ROM 203 is a nonvolatile memory that holds programs and data even when power is turned off. The storage device 204 is a storage device such as a hard disk drive (HDD) or a solid state drive (SSD), and stores, for example, an operation system (OS), a program, and various types of data.

The communication I/F 205 is an interface through which the computer 200 communicates with another information processing device. For example, when the computer 200 is the server device 100, the communication I/F 205 is a network interface such as a wired or wireless local area network (LAN). In a case where the computer 200 is the vehicle-mounted device 110, the communication I/F 205 is, for example, a communication interface such as a controller area network (CAN) for communicating with a vehicle-mounted ECU mounted in the vehicle 10, the communication device 120, and the like.

The external connection I/F 206 is an interface for connecting an external device to the computer 200. The external device includes, for example, a recording medium. When the computer 200 is the vehicle-mounted device 110, the external device may include the camera 140 and the communication device 120.

The input device 207 is an input device such as a keyboard, a touch panel, or an operation button, for receiving an input operation of a user. The display device 208 is a display device for displaying processing results and the like of the computer 200. The system bus 209 is connected to the above-described components in common, and transfers, for example, an address signal, a data signal, and various control signals.

First Embodiment

A functional configuration of the information providing system 1 according to the first embodiment will be described.

Functional Configuration

Figure 3:
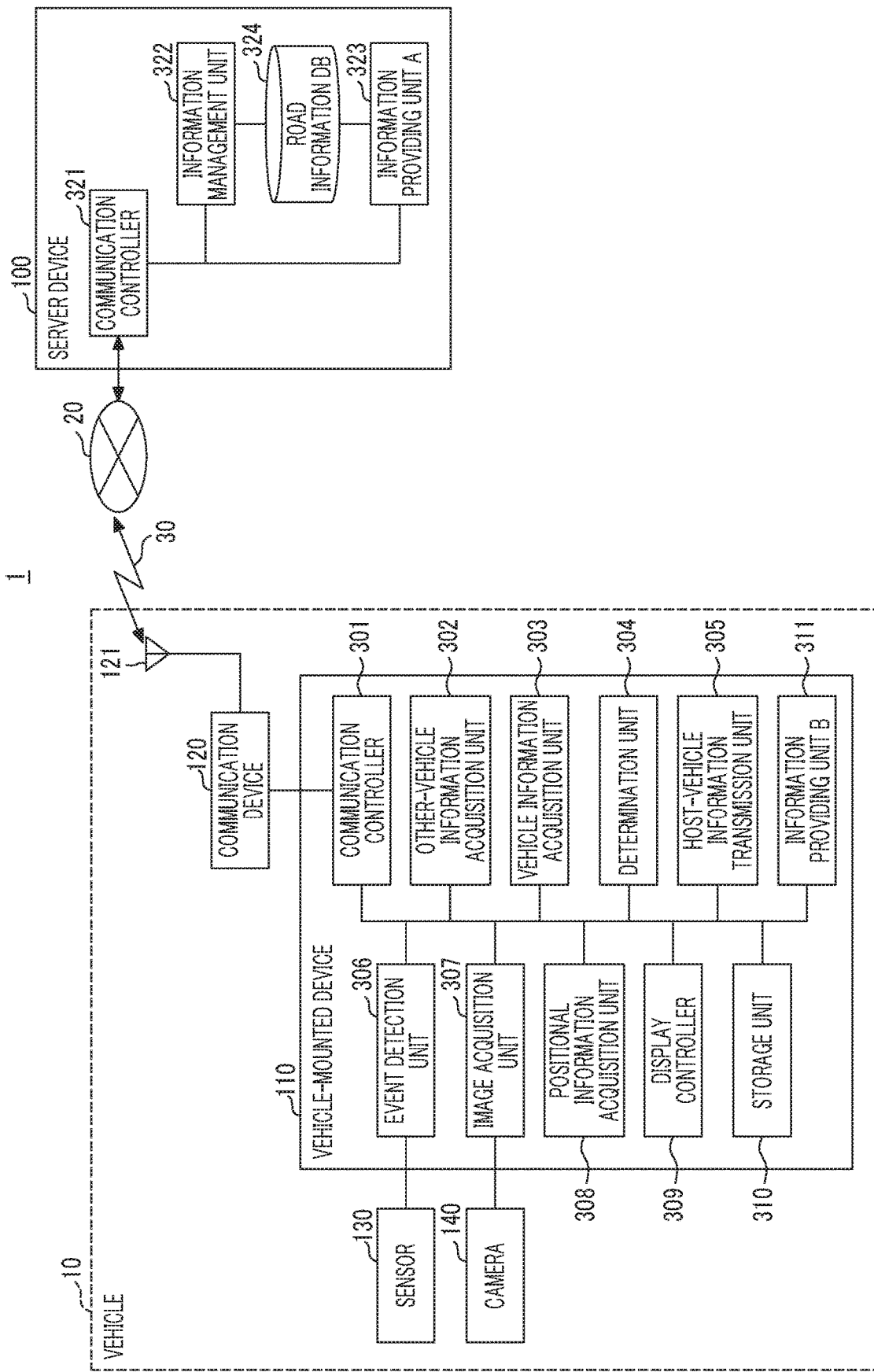
FIG. 3 is a diagram illustrating an example of a functional configuration of an information providing system according to a first embodiment.

FIG. 3 is a diagram illustrating an example of a functional configuration of the information providing system according to the first embodiment.

Functional Configuration of Vehicle-Mounted Device

The vehicle-mounted device 110 includes, for example, a communication controller 301, an other-vehicle information acquisition unit 302, a vehicle information acquisition unit 303, a determination unit 304, a host-vehicle information transmission unit 305, an event detection unit 306, an image acquisition unit 307, a positional information acquisition unit 308, a display controller 309, a storage unit 310, and an information providing unit B 311.

For example, the vehicle-mounted device 110 realizes each above-described functional configuration by the CPU 201 in FIG. 2 executing a program stored in a recording medium such as the ROM 203 or the storage device 204. At least a part of each of the above-described functional configurations may be realized by hardware.

The communication controller 301 is realized by, for example, a program executed by the CPU 201 in FIG. 2, and connects the vehicle-mounted device 110 to the communication network 20 using the communication device 120 to perform communication with the server device 100 or the other vehicle-mounted device 110. The communication device 120 is, for example, a wireless communication device or a wireless communication module that performs wireless communication using the vehicle 10 or one or more antennas 121 provided in the communication device 120 under the control of the communication controller 301.

The other-vehicle information acquisition unit (an example of a first information acquisition unit) 302 is realized by, for example, a program executed by the CPU 201 in FIG. 2. The other-vehicle information acquisition unit 302 acquires other-vehicle information including positional information indicating a point at which a predetermined event on the road is detected by another vehicle (first vehicle), and vehicle information acquired by the first vehicle at the point (first vehicle information). For example, the other-vehicle information acquisition unit 302 acquires positional information of a point at which the first vehicle has detected a shake (for example, shake) equal to or greater than a predetermined value, and other-vehicle information including the vehicle information acquired by the first vehicle at the point from the server device 100 using the communication controller 301.

FIG. 4A illustrates an image of the other-vehicle information acquired by the other-vehicle information acquisition unit 302. As illustrated in FIG. 4A, the other-vehicle information 401 includes information such as "position ID", "positional information", and "vehicle information". The "position ID" is identification information for identifying the point (position) at which the first vehicle detects a predetermined event, and is determined (issued) by the server device 100, for example.

The "positional information" is information indicating the position of the point at which a first vehicle detects the predetermined event, and includes, for example, information such as position coordinates, a road division, a traveling direction, and lane acquired by the first vehicle.

The position coordinates are coordinate information such as a latitude and a longitude of the point at which the first vehicle detects the predetermined event. The position coordinates may include altitude information. The road division is information indicating the road division (for example, a general road or an expressway) of the road at the point. The traveling direction is information indicating a traveling direction of the first vehicle (for example, an azimuth angle of the vehicle or up/down) at the point. The lane is information indicating the lane where the first vehicle was traveling at the point.

The information included in the "positional information" illustrated in FIG. 4A is an example. The "positional information" may be information that can specify the point at which the other vehicle detects the predetermined event. For example, at least a part of the "positional information" illustrated in FIG. 4A may not be included in the "positional information".

The "vehicle information" is vehicle information acquired at the point at which the first vehicle detecting the predetermined event detects the predetermined event, and includes information such as a magnitude of the shake, a vehicle speed, a steering angle, an acceleration, sideslip, and the like. The magnitude of the shaking is information indicating, for example, the magnitude of pitching detected by the sensor 130 mounted on the first vehicle. The vehicle speed is information indicating a traveling speed of the first vehicle. The steering angle is information indicating the angle of steering in the first vehicle. The acceleration is information indicating an acceleration in a traveling direction in the first vehicle. The sideslip is information indicating on/off (operating or not operating) of a traction control function for reducing an idle rotation of tires in the first vehicle. For example, the vehicle information acquisition unit 303 of the vehicle-mounted device 110 mounted on the first vehicle acquires the vehicle information from the vehicle control ECU that controls the first vehicle, the sensor 130, or the like.

The information included in the "vehicle information" illustrated in FIG. 4A is an example. For example, at least a part of "vehicle information" illustrated in FIG. 4A may not be included in the "vehicle information". The "vehicle information" may include information different from the information included in "vehicle information" illustrated in FIG. 4A.

Referring back to FIG. 3, description of the functional configuration of the vehicle-mounted device 110 will be continued.

The vehicle information acquisition unit (an example of a second information acquisition unit) 303 is realized by, for example, a program executed by the CPU 201 in FIG. 2. The vehicle information acquisition unit 303 acquires vehicle information (second vehicle information) of the host vehicle (the second vehicle) at the point at which the first vehicle detects the predetermined event using the positional information included in the other-vehicle information acquired by the other-vehicle information acquisition unit 302. For example, when the event detection unit 306 detects a predetermined event, the vehicle information acquisition unit 303 acquires the vehicle information of the host vehicle. The vehicle information acquired by the vehicle information acquisition unit 303 includes, for example, each piece of information corresponding to "vehicle information" of the other-vehicle information 401 in FIG. 4A.

The determination unit 304 is realized by, for example, a program executed by the CPU 201 in FIG. 2. Using the vehicle information of the first vehicle at the point at which the first vehicle detects the predetermined event, and the vehicle information of the second vehicle (the host vehicle), the determination unit 304 determines ease of road traffic at the point (or a degree of danger at the time of passage of the road) as to levels.

For example, when a shake of a predetermined value or more is not detected in the second vehicle at a point at which a shake of a predetermined value or more is detected in the first vehicle, the determination unit 304 compares the vehicle information of the first vehicle with the vehicle information of the second vehicle to perform the following determination as an example.

For example, the determination unit 304 determines the ease of road traffic at the point to be at a first level indicating that safe passage is possible when a difference in a vehicle speed between the first vehicle and the second vehicle is smaller than the first threshold value at the point and a difference in a steering angle between the first vehicle and the second vehicle is smaller than the second threshold value.

The first threshold value is a predetermined value to determine whether the vehicle speed of the first vehicle is equal to the vehicle speed of the second vehicle (for example, whether or not the second vehicle decelerates in order to pass through an obstacle on the road). The second threshold value is a predetermined value to determine whether or not the steering angle of the first vehicle is equal to the steering angle of the second vehicle (for example, whether or not the second vehicle changes the lane in order to avoid the obstacle on the road.).

Accordingly, even when the second vehicle travels at the point at the same vehicle speed and steering angle as the first vehicle, the determination unit 304, for example, determines that the obstacle on the road at the point is eliminated and the road is at the first level at which safe traveling is possible since the shake exceeding the predetermined value is not detected.

When the difference in the vehicle speed between the first vehicle and the second vehicle at the point is smaller than the first threshold value and the difference in the steering angle between the first vehicle and the second vehicle is equal to or greater than the second threshold value, the determination unit 304 determines that the road is at a second level including a safely passable lane at the point. In this case, the determination unit 304 determines that the second vehicle can safely pass through the point by performing the lane change at the point, and determines the ease of the road traffic at the point is, for example, the second level lower than the first level.

When the difference in the vehicle speed between the first vehicle and the second vehicle at the point is equal to or greater than the first threshold value, the determination unit 304 determines that the road is at a third level at which safe passage is possible through deceleration at the point. In this case, the determination unit 304 determines that the second vehicle can safely pass through the point through deceleration at the point, and determines the ease of road traffic at the point to be, for example, at the third level lower than the first level and the second level.

The host-vehicle information transmission unit (transmission unit) 305 is realized by, for example, a program executed by the CPU 201 in FIG. 2. The host-vehicle information transmission unit 305 transmits the information on the point including the vehicle information of the second vehicle and the determination result of the determination unit 304 at the point at which the first vehicle detects the predetermined event to an information processing device that provides the information on the road indicating the ease of the road traffic. For example, the host-vehicle information transmission unit 305 transmits the information on the point including the vehicle information of the second vehicle and the determination result of the determination unit 304 at the point at which the first vehicle detects the shake of a predetermined value or more to the server device 100 via the communication controller 301.

Desirably, the information on the point transmitted by the host-vehicle information transmission unit 305 includes a detection result of the predetermined event (for example, a shake of a predetermined value or more) in the second vehicle.

Desirably, the information on the point transmitted by the host-vehicle information transmission unit 305 includes image data obtained by imaging the point and surroundings of the point that is acquired by the image acquisition unit 307.

The event detection unit 306 is realized by, for example, a program executed by the CPU 201 in FIG. 2, and detects a predetermined event. For example, the event detection unit 306 detects that a shake (for example, pitching) of the predetermined value or more has been detected by the sensor 130. As described above, it is assumed that the predetermined value, for example, is assumed to be a predetermined value that is detected when there is an obstacle such as a collapse, a falling rock, or a falling object on a road, and is difficult to detect at the time of normal traveling.

When a predetermined event is detected by the event detection unit 306, the host-vehicle information transmission unit 305 transmits the information on the point including the positional information on the point at which the predetermined event is detected and the vehicle information acquired by the vehicle information acquisition unit 303 at the point to the server device 100.

The image acquisition unit 307 is realized by, for example, a program executed by the CPU 201 in FIG. 2 and acquires image data obtained by imaging the periphery of the vehicle 10 using the camera 140. The image data acquired by the image acquisition unit 307 may be moving image data or one or more pieces of still image data.

For example, the image acquisition unit 307 continuously images the periphery of the vehicle 10, stores image data in the storage unit 310, and acquires the image data at a point in time (and before and after the point) when the event detection unit 306 detects the predetermined event from among the stored image data.

The positional information acquisition unit 308 is realized by, for example, a program executed by the CPU 201 in FIG. 2, and acquires positional information indicating the position of the vehicle 10. For example, the positional information acquisition unit 308 acquires information corresponding to "positional information" of the other-vehicle information 401 illustrated in FIG. 4A.

For example, the positional information acquisition unit 308 acquires position coordinates indicating the position of the vehicle 10 from the car navigation device mounted on the vehicle 10, the positional information included in the image data captured by the camera 140, or the like. Alternatively, the positional information acquisition unit 308 may calculate position coordinates by itself using a global positioning system (GPS), the vehicle information of the vehicle 10, or the like.

Similarly, the positional information acquisition unit 308 acquires information such as a road division, a traveling direction, and a lane from, for example, the car navigation device mounted on the vehicle 10. Alternatively, the positional information acquisition unit 308 may analyze the image data captured by the camera 140 or the like and acquire the information by itself.

For example, the display controller 309 is realized by a program executed by the CPU 201 in FIG. 2, and displays a display screen or the like provided by the server device 100 or the information providing unit B 311 on the display device 208 in FIG. 2, an external display device, or the like.

The storage unit 310 is realized by, for example, a program executed by the CPU 201 in FIG. 2, the storage device 204, the RAM 202, and the like, and stores, for example, the other-vehicle information 401 acquired by the other-vehicle information acquisition unit 302, the image data captured by the camera 140, and the like.

The information providing unit B 311 is realized by, for example, a program executed by the CPU 201 in FIG. 2, and acquires and provides a display screen for information on the road provided from the server device 100, the information on the road provided from the other vehicle, or the like. As an example, the information providing unit B 311 has a function of a web browser, connects to a web server provided by the server device 100, and displays a web page provided by the server device 100 using the display controller 309.

Functional Configuration of Server Device

The server device 100 includes, for example, a communication controller 321, an information management unit 322, an information providing unit A 323, and a road information database (DB) 324. The road information DB 324 may be realized by another information processing device or the like provided outside the server device 100.

The server device 100 realizes the respective above-described functional configurations by, for example, a program executed by the CPU 201 in FIG. 2 (or a program executed by the plurality of computers 200).

The communication controller 321 is realized by, for example, a program executed by the CPU 201 in FIG. 2, and performs communication with one or more vehicle-mounted devices 110 mounted on one or more vehicles 10 using the communication OF 205 or the like.

The information management unit 322 is realized by, for example, a program executed by the CPU 201 in FIG. 2, and stores information on the point at which the predetermined event is detected, which is transmitted from one or more vehicle-mounted devices 110 in the road information DB 324 for management.

In the road information DB 324, for example, information 402 on the point acquired by one or more second vehicles at a point at which the first vehicle detects the predetermined event as illustrated in FIG. 4B is included. In the example of FIG. 4B, the information 402 on the point includes "position ID", "date and time", "vehicle ID", "state", "vehicle information", "image data", and the like.

The "position ID" corresponds to the position ID included in the other-vehicle information 401 illustrated in FIG. 4A, and is identification information for identifying the point (position) at which the first vehicle detects the shake of a predetermined value or more. For example, when the information on the point received from the vehicle-mounted device 110 is information on a point unregistered in the road information DB 324, the information management unit 322 determines (issues) a new position ID and manages the received information on the point. The information management unit 322 notifies the vehicle-mounted device 110 mounted on the vehicle 10 included in the information providing system 1 of the other-vehicle information 401 corresponding to the newly issued position ID.

The "date and time" is information indicating a date and time when the second vehicle acquires (or transmits) the information on the point. The "Vehicle ID" is identification information for identifying the second vehicle that transmits the information on the point.

The "state" is information indicating a state of a road at the point. For example, a determination result indicating that information such as "passable", "safe lane available", and "deceleration needed" is included in the information on the point transmitted from the second vehicle is stored.

On the other hand, the information management unit 322 determines information such as "not passable" or "shaking" using the information on the point transmitted from the second vehicle. For example, it is assumed that the information on the point transmitted from the second vehicle includes image data before and after the point, and the image data includes position coordinates at the time of imaging. In this case, the information management unit 322 can determine whether or not the second vehicle has passed through the point based on the positional information included in the image data.

As another example, in a case where the vehicle-mounted device 110 of the second vehicle detects a shake of a predetermined value or more at the point, the vehicle-mounted device 110 of the second vehicle may also transmit the information on the point indicating whether or not the vehicle has passed through the point to the server device 100, in addition to the positional information and the vehicle information at the point.

For example, as described above, the information management unit 322 determines whether or not the second vehicle has passed through the point and sets the "state" of the point to "not passable" when the second vehicle detects a shake of a predetermined value or more at the point and does not pass through the point. When the second vehicle detects the shake of the predetermined value or more at the point and passes the point, the information management unit 322 sets the "state" of the point to "shaking".

The "vehicle information" corresponds to the "vehicle information" of the other-vehicle information 401 illustrated in FIG. 4A. For example, information such as the magnitude of the shake, the vehicle speed, the steering angle, the acceleration, and the sideslip is included. The "image data"

is one or more pieces of image data included in the information on the point transmitted from the second vehicle. The information 402 on the point may further include, for example, information such as the "positional information".

The information providing unit A 323 is realized by, for example, a program executed by the CPU 201 in FIG. 2 and provides information on the road indicating the ease of road traffic using the determination result of the determination unit 304 of the vehicle-mounted device 110. For example, the information providing unit A 323 has a function of a web server, generates a display screen including map information indicating the ease of road traffic and an image of a point at which the first vehicle detects the shake of a predetermined value or more, and provides a web page including the generated display screen. An example of the display screen provided by the information providing unit A 323 and a display screen creation process will be described below.

Process Flow

A flow of a process of the information providing method in the information providing system 1 according to the first embodiment will be described.

Process of Vehicle-Mounted Device

FIG. 5 is a flowchart illustrating an example of a process of the vehicle-mounted device according to the first embodiment. The vehicle-mounted device 110 mounted on the vehicle 10 executes the process illustrated in FIG. 5, for example, after the vehicle 10 is activated (ignition-on) such that the vehicle 10 can travel.

In step S501, the other-vehicle information acquisition unit 302 acquires the other-vehicle information 401 that is the information on the point at which the first vehicle (another vehicle) detects a shake of a predetermined value or more, for example, as illustrated in FIG. 4A, from the server device 100 via the communication controller 301.

In step S502, the vehicle-mounted device 110 determines whether or not the shake of a predetermined value or more is detected in the second vehicle (host vehicle) by the event detection unit 306. When no shake of a predetermined value or more is detected, the vehicle-mounted device 110 causes the process to proceed to step S503. On the other hand, when a shake of a predetermined value or more is detected, the vehicle-mounted device 110 causes the process to proceed to step S510.

In step S503, the vehicle-mounted device 110 determines whether the position of the second vehicle is the point at which the first vehicle has detected a shake of a predetermined value or more based on the positional information included in the acquired other-vehicle information 401 and the positional information acquired by the positional information acquisition unit 308.

When the position of the second vehicle is not the point at which the first vehicle has detected a shake of a predetermined value or more, the vehicle-mounted device 110 returns to the process of step S502 and executes the same process again. On the other hand, when the position of the second vehicle is the point at which the first vehicle has detected a shake of a predetermined value or more, the vehicle-mounted device 110 executes processes of step S504 and the subsequent steps.

In step S504, the vehicle information acquisition unit 303 acquires vehicle information (for example, a vehicle speed and a steering angle) of the second vehicle, and the image acquisition unit 307 acquires an image (camera image) of the point imaged by the camera 140.

Desirably, the image of the point acquired by the image acquisition unit 307 includes an image of the point at which another vehicle detects a shake of a predetermined value or more, an image before and after the point, and the like.

In step S505, the determination unit 304 determines whether or not there is a difference between the vehicle speed of the first vehicle included in the other-vehicle information 401 acquired by the other-vehicle information acquisition unit 302 and the vehicle speed of the second vehicle acquired by the vehicle information acquisition unit 303. For example, when the difference in the vehicle speed between the first vehicle and the second vehicle is equal to or greater than the first threshold value described above, the determination unit 304 determines that there is a difference in the vehicle speed between the first vehicle and the second vehicle.

When the determination unit 304 determines that there is a difference in a vehicle speed between the first vehicle and the second vehicle, the determination unit 304 determines the ease of road traffic at the point to be "deceleration needed" (the third level) in which safe passage is possible through deceleration in step S506.

On the other hand, when the determination unit 304 determines that there is no difference in vehicle speed between the first vehicle and the second vehicle, the determination unit 304 causes the process to proceed to step S507.

In step S507, the determination unit 304 determines whether there is a difference between the steering angle of the first vehicle included in the other-vehicle information 401 acquired by the other-vehicle information acquisition unit 302 and the steering angle of the second vehicle acquired by the vehicle information acquisition unit 303. For example, when the difference between the steering angle of the first vehicle and the steering angle of the second vehicle is equal to or greater than the second threshold value described above, the determination unit 304 determines that there is a difference between the steering angle of the first vehicle and the steering angle of the second vehicle.

When the determination unit 304 determines that there is a difference in the steering angle between the first vehicle and the second vehicle, the determination unit 304 determines the ease of road traffic at the point to be "safe lane available" (the second level) that is a level at which safe traveling is possible through lane changing in step S508.

On the other hand, when the determination unit 304 determines that there is no difference in the steering angle between the first vehicle and the second vehicle, the determination unit 304 determines the ease of road traffic at the point to be "passable" (the first level) that is a level at which safely travelable is possible in step S509.

The vehicle information of the second vehicle acquired in step S504, the image of the point, and the determination result of the determination unit 304 determined in steps S505 to S509, for example, are stored in the storage unit 310 in step S511.

As another example, the vehicle information of the second vehicle acquired in step S504, the image of the point, and the determination result of the determination unit 304 may be transmitted as information on the point from the host-vehicle information transmission unit 305 to the server device 100.

On the other hand, when the process proceeds from step S502 to step S510, the positional information acquisition unit 308 acquires the positional information of the point at which the shake of a predetermined value or more is detected, and the vehicle information acquisition unit 303 acquires the vehicle information of the second vehicle at the point at which the shaking of the predetermined value or more is detected. The image acquisition unit 307 acquires image data of the point at which the shake of a predetermined value or more is detected, and image data before and after the point. As one example, the acquired positional information, the acquired vehicle information, and the acquired image data (camera image) are stored in the storage unit 310 in step S511.

As another example, the positional information, the vehicle information, and the image data acquired in step S510 may be transmitted from the host-vehicle information transmission unit 305 to the server device 100 as the information on the point.

When the information acquired in steps S502 to S510 is stored in a storage unit in step S511, the host-vehicle information transmission unit 305 determines whether or not an accessory power supply is off (ACC-OFF) in step S512.

When the accessory power supply is not ACC-OFF, the host-vehicle information transmission unit 305 returns the process of step S502, and the vehicle-mounted device 110 repeatedly executes the same process. On the other hand, when the accessory power supply is ACC-OFF, the host-vehicle information transmission unit 305 transmits the information on the point stored in the storage unit 310 to the server device 100 or the like in step S513.

The process illustrated in FIG. 5 is an example. For example, in step S502, the event detection unit 306 detects one or more predetermined events (for example, sideslip, falling rock, flood, or snow accumulation) that is different from the shake of the predetermined value or more.

When a shake of a predetermined value or more is detected in step S02, the determination unit 304 of the vehicle-mounted device 110 determines whether the road is in a "not passable" state in which the second vehicle cannot pass through the point or a "shaking" state in which the second vehicle can pass through the point. Accordingly, for example, in the server device 100, it is possible to omit the process of determining whether or not the second vehicle has passed through the point, and therefore, it is possible to reduce a load on the server device 100.

Process of Server Device

Figure 6:
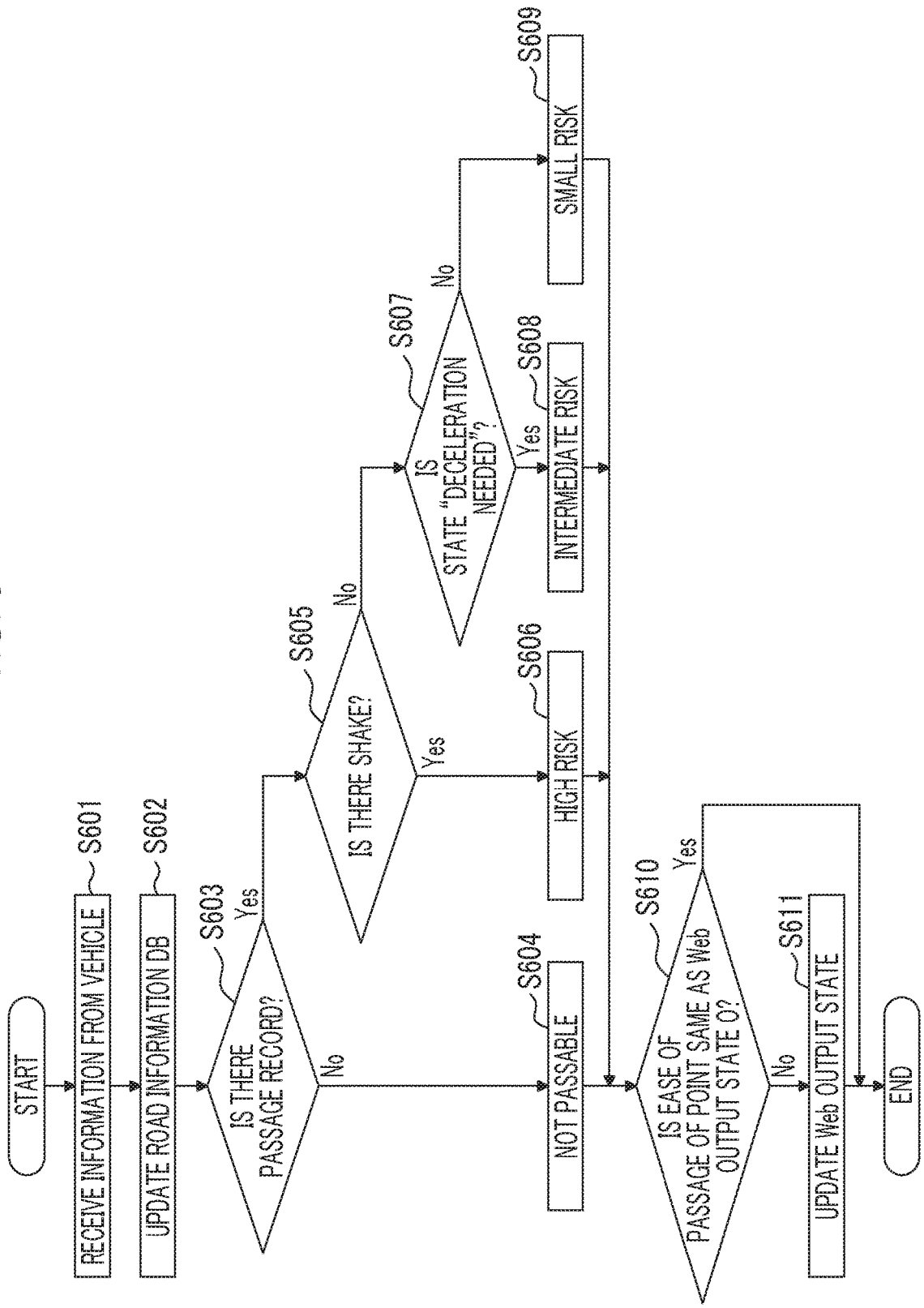
FIG. 6 is a flowchart illustrating an example of a process of a server device according to the first embodiment.

FIG. 6 is a flowchart illustrating an example of a process of the server device according to the first embodiment. The process is an example of a process that is executed when the server device 100 receives the information on the point transmitted from the second vehicle.

In step S601, when the communication controller 321 of the server device 100 receives the information on the point transmitted from the second vehicle, the server device 100 executes processes of step S602 and subsequent steps.

In step S602, the information management unit 322 updates the road information DB 324 using the information received by the communication controller 321. For example, the information management unit 322 updates the information 402 on the point as illustrated in FIG. 4B using the information received by the communication controller 321.

In step S603, the information providing unit A 323 determines whether or not there is a passage record indicating that the vehicle has passed through the point within a predetermined period (for example, latest one hour, latest three hours, latest six hours, and latest 24 hours). For example, when information different from "not passable" as "the state" is stored within a predetermined period, the information providing unit A 323 determines that there is a passage record using the information 402 on the point as illustrated in FIG. 4B.

When the information providing unit A 323 determines that there is a passage record, the information providing unit A 323 causes the process to proceed to step S605. On the other hand, when the determination unit 304 determines that there is no passage record, the information providing unit A 323 causes the process to proceed to step S604.

When the proceeds to step S604, the information providing unit A 323 determines that the road is not passable at the point.

On the other hand, when the process proceeds from step S603 to step S605, the information providing unit A 323 determines whether the vehicle having passed the point has detected shaking within the predetermined period (whether there is a shake). For example, when information "shaking" is stored as "state" within a predetermined period, the information providing unit A 323 determines that the vehicle having passed through the point has detected the shake using the information 402 on the point as illustrated in FIG. 4B.

When the information providing unit A 323 determines that the vehicle having passed through the point has detected a shake, the information providing unit A 323 causes the process to proceed to step S606. On the other hand, when the information providing unit A 323 determines that the vehicle having passed through the point has not detected the shake, the information providing unit A 323 causes the process to proceed to step S607.

When the process proceeds to step S606, the information providing unit A 323 determines the ease of road traffic at the point to be "high risk" indicating a high risk of passage of the point.

On the other hand, when the process proceeds from step S605 to step S607, the information providing unit A 323 determines whether or not the "state" of the vehicle having passed the point within the predetermined period is "deceleration needed". For example, when information of "deceleration needed" is stored in the "state" within a predetermined period using the information 402 on the point as illustrated in FIG. 4B, the information providing unit A 323 determines the state of the vehicle having passed through the point to be "deceleration needed". Alternatively, when a ratio of storage of the information "deceleration needed" in the "state" is equal to or greater than the predetermined ratio in the predetermined period, the information providing unit A 323 may determine the state of the vehicle having passed through the point to be "deceleration needed".

When the information providing unit A 323 determines that the state of the vehicle having passed through the point is "deceleration needed", the information providing unit A 323 determines the ease of road traffic at the point to be "intermediate risk" indicating a lower risk than "high risk" in step S608.

On the other hand, when the information providing unit A 323 determines that the state of the vehicle having passed through the point is not "deceleration needed", the information providing unit A 323 determines the ease of road traffic at the point to be "small risk" indicating a lower risk than "high risk" and "intermediate risk" in step S609.

In step S610, the information providing unit A 323 determines whether or not the ease of passage of the point determined in steps S603 to S609 is the same as an output state of the display screen on the web page being provided.

When the ease of passage is the same as the output state of the display screen on the web page being provided, the information providing unit A 323 ends the process. On the other hand, when the ease of passage is not the same as the output state of the display screen on the web page being provided, the information providing unit A 323 updates map information indicating the output state of the web page, for example, the ease of passage at the point at step S611.

Example of Display Screen Provided by Information Providing Unit

FIG. 7 is a diagram illustrating an example of a display screen provided by the information providing unit according to an embodiment. For example, the information providing unit A 323 has a function of a web server and displays a display screen as illustrated in FIG. 7 on an information processing device connected to a predetermined connection destination with a web browser.

In FIG. 7, the display screen provided by the information providing unit A 323 includes map information 700 indicating ease of road traffic.

Desirably, the user can set a predetermined period for determining the ease of road traffic from a plurality of options 701 displayed on the map information 700.

The information providing unit A 323 displays the ease of road traffic determined by the process illustrated in FIG. 6 as levels using a line 702 indicating "not passable", a line 703 indicating "high risk", a line 704 indicating "intermediate risk", a line 705 indicating "low risk", and the like.

Desirably, the display screen provided by the information providing unit A 323 includes an image 707 of a point at which the first vehicle has detected a shake of a predetermined value or more. The image 707 can be displayed, for example, by the user selecting a camera icon 706 displayed on the display screen. When the camera icon 706 is selected, the information providing unit A 323 displays the image 707 of the point, for example, using the image data acquired by the vehicle 10 having detected the greatest shake by referring to the "vehicle information" of the information 402 on the point as illustrated in FIG. 4B.

With the display screen as described above, the user of the information providing system 1 can easily determine the ease of road traffic using the map information 700 and confirm a situation of the site using the image 707.

The display screen illustrated in FIG. 7 is an example of a display screen provided by the information providing unit A 323. For example, the information providing unit A 323 may display the map information 700 on the display screen using information such as "deceleration needed", "safe lane available", and "passable" determined by the vehicle-mounted device 110 instead of the information such as "high risk", "intermediate risk", and "low risk".

As described above, according to the first embodiment, in the information providing system 1 that provides the information on the road using the vehicle information acquired by the vehicle 10, it is possible to provide information on the road from which the user can determine the ease of road traffic.

Second Embodiment

In the first embodiment, the determination unit 304 of the vehicle-mounted device 110 determines the ease of road traffic as the levels using the information indicating the vehicle speed and the steering angle among the vehicle information acquired from the first vehicle and the second vehicle. However, this is merely an example, and the determination unit 304 of the vehicle-mounted device 110 may determine the ease of road traffic as the levels using vehicle information other than the vehicle speed and the steering angle.

In the second embodiment, an example of a process in a case where the determination unit 304 of the vehicle-mounted device 110 determines the ease of road traffic as levels using the vehicle information other than the vehicle speed and the steering angle will be described.

Figure 8A:
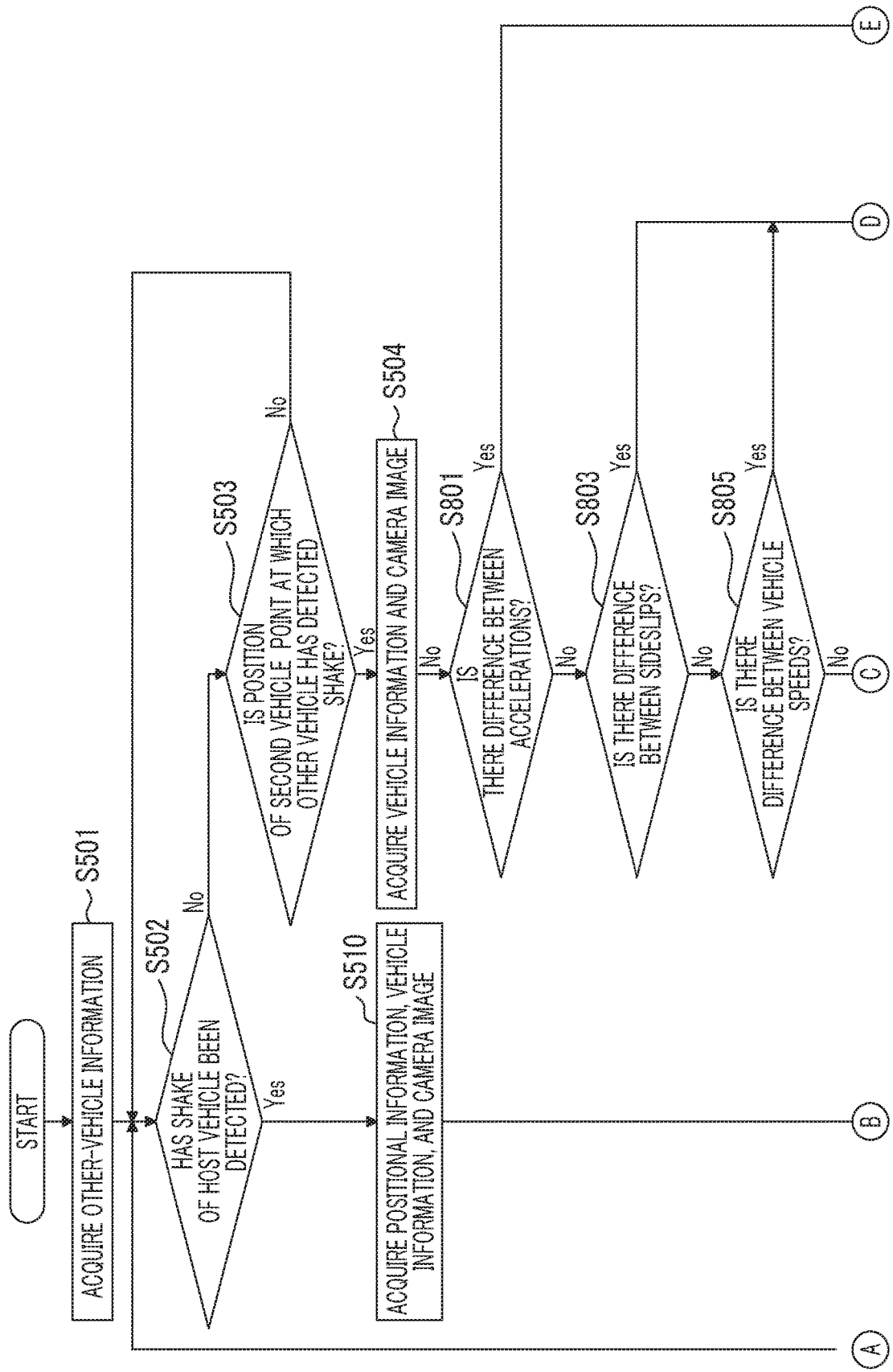
FIG. 8A is a flowchart illustrating an example of a process of the vehicle-mounted device according to a second embodiment.

FIGS. 8A and 8B are diagrams illustrating an example of a process of the vehicle-mounted device according to the second embodiment. Among processes illustrated in FIGS. 8A and 8B, processes of steps S501 to S504 and S510 to S513 are the same as the processes in the first embodiment illustrated in FIG. 6, and therefore, differences between the first embodiment and the second embodiment will be mainly described. Here, it is assumed that the vehicle information acquired by the vehicle information acquisition unit 303 includes information on an acceleration and a sideslip of the vehicle 10.

In step S801, the determination unit 304 determines whether or not there is a difference between the acceleration of the first vehicle included in the other-vehicle information 401 acquired by the other-vehicle information acquisition unit 302 and the acceleration of the second vehicle acquired by the vehicle information acquisition unit 303. For example, when the difference in the acceleration between the first vehicle and the second vehicle is equal to or greater than a third threshold value, the determination unit 304 determines that there is a difference in the acceleration between the first vehicle and the second vehicle.

The difference in acceleration is used, for example, to determine a situation such as a decrease in vehicle speed due to snow accumulation, muddiness, flooding, and the like on the road.

When the determination unit 304 determines that there is the difference in the acceleration between the first vehicle and the second vehicle, the determination unit 304 determines the ease of road traffic at the point to be "acceleration needed" in which an acceleration operation is needed at the point in step S802. On the other hand, when the difference in the acceleration between the first vehicle and the second vehicle is smaller than the third threshold value, the determination unit 304 causes the process to proceed to step S803.

In step S803, the determination unit 304 determines whether or not there is a difference in the sideslip of the first vehicle included in the other-vehicle information 401 acquired by the other-vehicle information acquisition unit 302 and the sideslip of the second vehicle acquired by the vehicle information acquisition unit 303. For example, when the presence or absence of the sideslip in the first vehicle differs from the presence or absence of the sideslip in the second vehicle, the determination unit 304 determines that there is a difference in the sideslip between the first vehicle and the second vehicle.

Information on the presence or absence of sideslip is used to determine a situation in which the vehicle 10 is sideslip, for example, by freezing roads, sand, fallen leaves, and the like.

When the determination unit 304 determines that there is a difference in the sideslip between the first vehicle and the second vehicle, the determination unit 304 determines the ease of road traffic at the point to be "deceleration needed" in which a deceleration operation is needed at the point in step S804.

On the other hand, when the determination unit 304 determines that there is no difference in the sideslip between the first vehicle and the second vehicle, the determination unit 304 causes the process to proceed to step S805.

In a situation in which the sideslip occurs at the point, for example, it is assumed that a shake equal to or more than the predetermined value detected in step S502 includes rolling due to contact with a guardrail, another vehicle, or the like.

Therefore, the shake exceeding the predetermined value according to the second embodiment may include not only pitching but also rolling.

In step S805, the determination unit 304 determines whether or not there is a difference between the vehicle speed of the first vehicle included in the other-vehicle information 401 acquired by the other-vehicle information acquisition unit 302 with vehicle speed of the second vehicle acquired by the vehicle information acquisition unit 303. The above-described process may be the same as the process of step S505 in FIG. 5.

When the determination unit 304 determines that there is a difference in a vehicle speed between the first vehicle and the second vehicle, the determination unit 304 determines the ease of road traffic at the point to be, for example, "deceleration needed", as in the first embodiment, in step S804.

On the other hand, when the determination unit 304 determines that there is no difference in the vehicle speed between the first vehicle and the second vehicle, the determination unit 304 causes the process to proceed to step S806.

In step S806, the determination unit 304 determines whether there is a difference between the steering angle of the first vehicle included in the other-vehicle information 401 acquired by the other-vehicle information acquisition unit 302 and the steering angle of the second vehicle acquired by the vehicle information acquisition unit 303. The above-described process may be the same as the process of step S507 in FIG. 5.

When the determination unit 304 determines that there is a difference in the steering angle between the first vehicle and the second vehicle, the determination unit 304 determines the ease of road traffic at the point to be, for example, "safe lane available" in step S807, as in the first embodiment.

On the other hand, when the determination unit 304 determines that there is no difference in the steering angle between the first vehicle and the second vehicle, the determination unit 304 determines the ease of road traffic at the point to be, for example, "passable" in step S808, as in the first embodiment.

As described above, the determination unit 304 can determine the ease of road traffic using various types of vehicle information acquired by the vehicle information acquisition unit 303, as needed.

In the first and second embodiments, since the vehicle-mounted device 110 includes the determination unit 304 and executes the determination process, an effect of a reduction in a load on the server device 100 that provides the information on the road indicating the ease of road traffic can be expected.

Third Embodiment

In the first and second embodiments, although a case where the vehicle-mounted device 110 includes the determination unit 304 has been described, the determination unit 304 may be provided in the server device 100. In the third embodiment, an example in a case where the server device 100 includes the determination unit 304 will be described.

Functional Configuration

Figure 9:
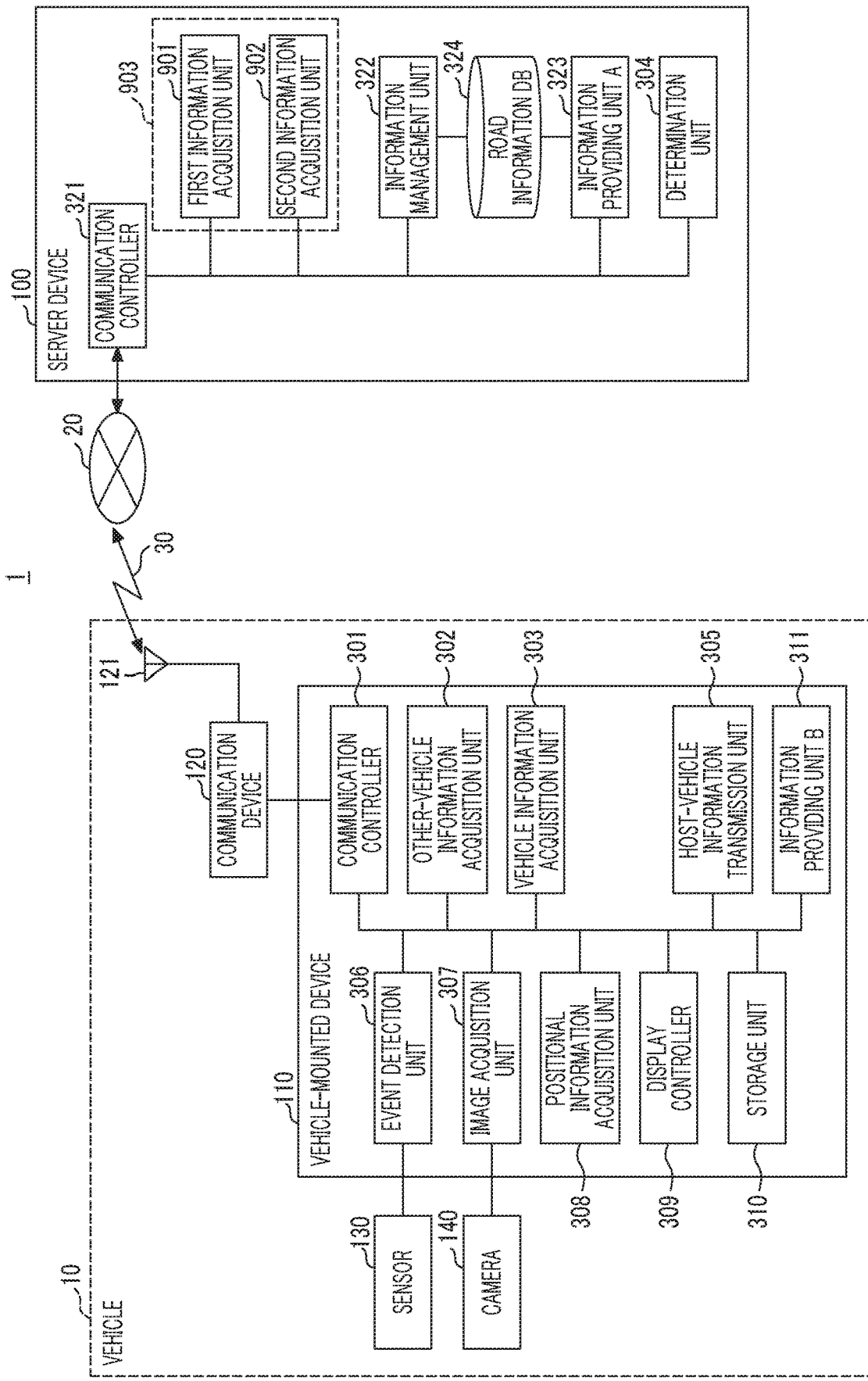
FIG. 9 is a diagram illustrating an example of a functional configuration of an information providing system according to a third embodiment.

FIG. 9 is a diagram illustrating an example of a functional configuration of the information providing system according to the third embodiment. Differences between the information providing system according to the third embodiment and the information providing system 1 according to the first embodiment illustrated in FIG. 3 will be mainly described herein.

Functional Configuration of Vehicle-Mounted Device

The vehicle-mounted device 110 according to the third embodiment may not include the determination unit 304 in the functional configuration of the vehicle-mounted device 110 according to the first embodiment illustrated in FIG. 3. In the third embodiment, the information on the point transmitted from the host-vehicle information transmission unit 305 to the server device 100 may not include the determination result of the determination unit 304.

The other functional configuration of the vehicle-mounted device 110 according to the third embodiment may be the same as the functional configuration of the vehicle-mounted device 110 according to the first embodiment illustrated in FIG. 3.

Functional Configuration of Server Device

The server device 100 according to the third embodiment includes, for example, a first information acquisition unit 901, a second information acquisition unit 902, and a determination unit 304, in addition to the functional configuration of the server device 100 according to the first embodiment illustrated in FIG. 3.

The first information acquisition unit 901 is realized by, for example, a program executed by the CPU 201 in FIG. 2 and acquires positional information indicating a point at which the first vehicle detects a predetermined event on a road, and the vehicle information (first vehicle information) of the first vehicle at the point. For example, the first information acquisition unit 901 receives information on the point including positional information indicating the point at which a shake of a predetermined value or more is detected, and the vehicle information of the first vehicle at the point that are transmitted by the first vehicle via the communication controller 321.

The second information acquisition unit 902 is realized by, for example, a program executed by the CPU 201 in FIG. 2 and acquires vehicle information of the second vehicle at the point at which the first vehicle detects the predetermined event (second vehicle information). For example, the second information acquisition unit 902 receives the information on the point including the vehicle information of the second vehicle transmitted by the second vehicle via the communication controller 321.

Functions of the first information acquisition unit 901 and the second information acquisition unit 902 may be realized by one information acquisition unit 903.

The information management unit (management unit) 322 according to the third embodiment stores the vehicle information of the first vehicle acquired by the first information acquisition unit 901 and the vehicle information of one or more second vehicles acquired by the second information acquisition unit 902 in the road information DB 324 and manages the vehicle information.

The determination unit 304 is realized by, for example, a program executed by the CPU 201 in FIG. 2 and determines the ease of road traffic at the point as levels using the vehicle information of the first vehicle managed by the information management unit 322 and the vehicle information of the second vehicle. The information providing unit A 323 according to the third embodiment provides the information on the road indicating the ease of road traffic using the determination result of the determination unit 304 of the server device 100.

Process Flow

Process of Server Device

Figure 10:
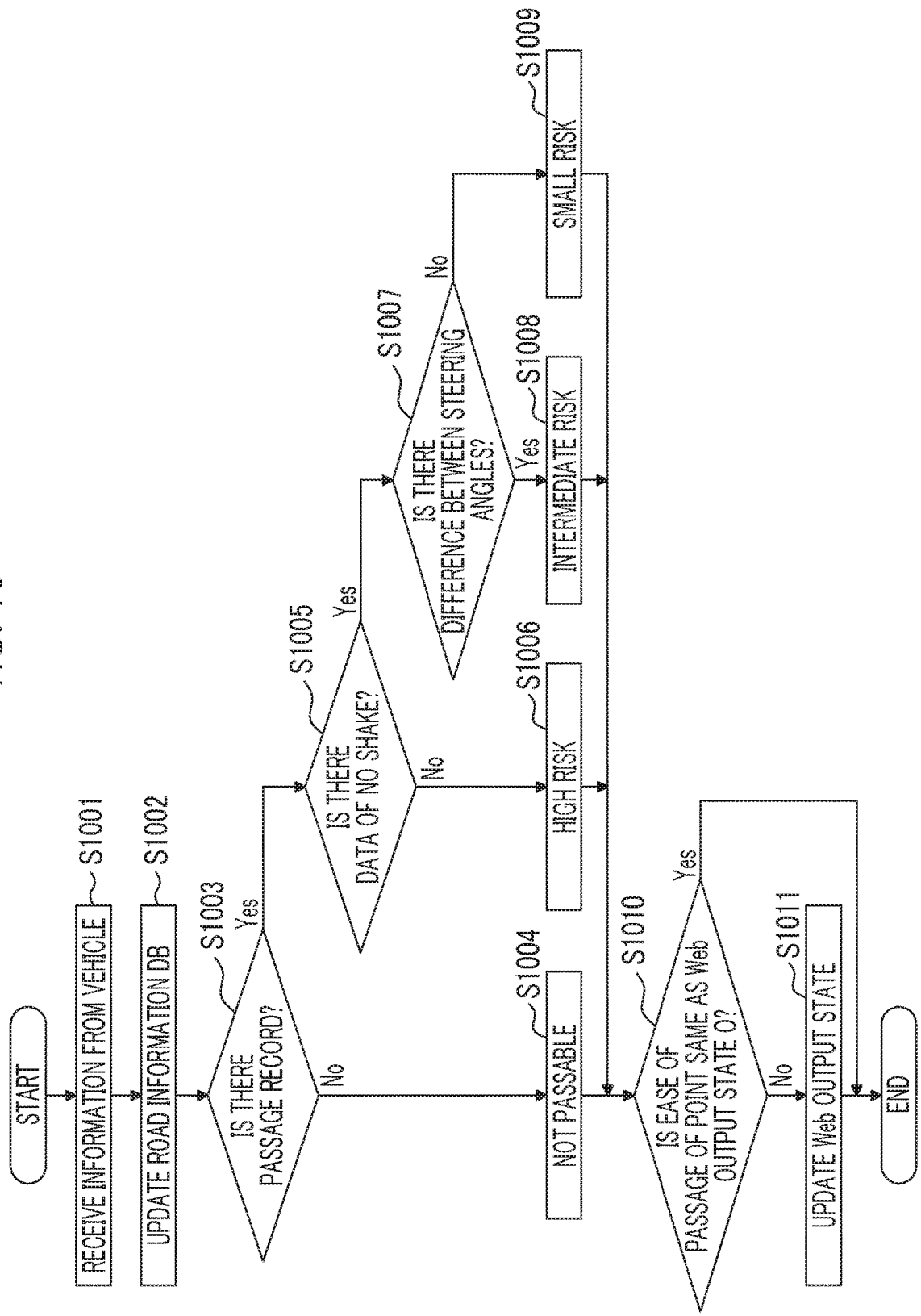
FIG. 10 is a flowchart illustrating an example of a process of a server device according to a third embodiment.

FIG. 10 is a flowchart illustrating an example of a process of the server device according to the third embodiment. Since a basic process of the server device 100 according to the third embodiment is the same as that of the server device according to the first embodiment illustrated in FIG. 6, detailed description of the same process will be omitted herein.

In step S1001, when the second information acquisition unit 902 of the server device 100 receives the information on the point transmitted from the second vehicle via the communication controller 321, the server device 100 executes processes of step S1002 and the subsequent steps.

In step S1002, the information management unit 322 updates the information on the point included in the road information DB 324 using the vehicle information of the second vehicle received by the second information acquisition unit 902. The information on the point included in the road information DB 324 according to the second embodiment may not include information of "state" among pieces of information included in the information 402 on the point according to the first embodiment illustrated in FIG. 4B.

In step S1003, the determination unit 304 determines whether or not there is a passage record indicating that the vehicle has passed through the point within a predetermined period (for example, latest one hour, latest three hours, latest six hours, or latest 24 hours).

When the determination unit 304 determines that there is a passage record, the determination unit 304 causes the process to proceed to step S1005. On the other hand, when it is not determined that there is a passage record, the determination unit 304 causes the process to proceed to step S1004.

When the process proceeds to step S1004, the determination unit 304 determines that the road is not passable at the point.

On the other hand, when the process proceeds from step S1003 to step S1005, the determination unit 304 determines whether or not there is data of "no shake", that is, data indicating that the shake of a predetermined value or more is not detected in the vehicle information of the second vehicle having passed the point within the predetermined period.

When there is the data of "no shake", the determination unit 304 causes the process to proceed to step S1007. On the other hand, when there is no data of "no shake", the determination unit 304 causes the process to proceed to step S1006.

When the process proceeds to step S1006, the determination unit 304 determines that the ease of road traffic at the point is "high risk".

On the other hand, when the process proceeds from step S1005 to step S1007, the determination unit 304 determines whether there is a difference in the steering angle between the first vehicle and the second vehicle having passed the point within a predetermined period. For example, the determination unit 304 determines whether or not a steering angle having a difference equal to or greater than a threshold value from the steering angle included in the first vehicle information is included in the vehicle information acquired from one or more second vehicles (or, whether or not the steering angle of a predetermined ratio or more is included).

When the determination unit 304 determines that there is a difference in the steering angle between the first vehicle and the second vehicle having passed through the point, the determination unit 304 determines the ease of road traffic at the point to be "intermediate risk" in step S1008.

On the other hand, when the determination unit 304 determines that there is no difference in the steering angle between the first vehicle and the second vehicle having passed through the point, the determination unit 304 determines the ease of road traffic at the point to be "low risk" in step S1009.

A determination result of the determination unit 304 in steps S1003 to S1009 is stored in the road information DB 324 as a determination result 1100 as illustrated in FIG. 11, for example.

FIG. 11 is a diagram illustrating an image of a determination result of the determination unit according to the third embodiment. In the example of FIG. 11, the determination result 1100 of the determination unit 304 includes information such as "position ID", "vehicle speed", "steering angle", "pitching", and "state".

The "Position ID" is identification information for identifying a point at which the first vehicle has detected a shake of a predetermined value or more. In the example of FIG. 11, solely information on the position ID "00020" is illustrated.

The "vehicle speed" is information indicating whether there is a difference in a vehicle speed between the first vehicle and the second vehicle (whether there is a difference equal to or greater than a threshold value) determined by the determination unit 304, and "O" is set when there is a difference in a vehicle speed between the first vehicle and the second vehicle. Similarly, the "steering angle" is set to "O" when there is a difference in the steering angle between the first vehicle and the second vehicle determined by the determination unit 304.

The "pitching" is set to "O" when a shake of the predetermined value or more (pitching) is detected in the second vehicle. The "state" stores information such as "not passable", "high risk", "intermediate risk", or "low risk", which is determined by the determination unit 304 in steps S1003 to S1009.

In the example of FIG. 11, the state "high risk" indicates that there is a record indicating that the second vehicles have passed the point, but the second vehicles having passed through the point all detect pitching. Therefore, a vehicle having passed through the above point is likely to suffer from any damage.

The state "intermediate risk" indicates that when there is a difference in the steering angle between the first vehicle and the second vehicle at the point, the pitching is not detected in the second vehicle. Therefore, a vehicle passing through the point is likely to avoid damage of the vehicle through a steering operation such as lane change.

The state "low risk" indicates that the pitching is not detected in any of the second vehicles at the point. Therefore, a vehicle passing through the point is likely not to suffer from damage, for example, without performing a special operation.

The information providing unit A 323 provides, for example, the information on the road indicating the ease of road traffic according to a transition, a ratio, or the like of the "state" within the predetermined period, which is stored in the determination result 1100 as described above.

Referring back to FIG. 10, description of the flowchart will be continued.

In step S1010, the information providing unit A 323 determines whether or not the ease of passage of the point is the same as the output state of the display screen on the web page being provided, for example, using the determination result 1100 of the determination unit 304 as illustrated in FIG. 11.

When the ease of passage is the same as the output state of the display screen on the web page being provided, the information providing unit A 323 ends the process. On the other hand, when the ease of passage is not the same as the output state of the display screen on the web page being provided, the information providing unit A 323 causes the process to proceed to step S1011.

When the process proceeds to step S1011, the information providing unit A 323 updates the output state of the web page, for example, the display screen as illustrated in FIG. 7, using the determination result 1100 as illustrated in FIG. 11.

Through the above process, the server device 100 can provide, for example, a web page or the like for displaying the display screen as illustrated in FIG. 7 even when the vehicle-mounted device 110 does not include the determination unit 304.

In the third embodiment, since the server device 100 includes the determination unit 304 and executes the determination process, an effect of reducing a load on the vehicle-mounted device 110 can be expected.

Application Example

While the embodiments of the present disclosure have been described above, the present disclosure is not limited to the above-described embodiments, and various modifications or changes can be made within the scope of the gist of the present disclosure described in the claims.

For example, the information providing system 1 may acquire information on the vehicle type of the vehicle 10 passing the road, which is included in the vehicle information, and provide information indicating the ease of road traffic for each vehicle type. Alternatively, the information providing system 1 may acquire information such as a weight or a vehicle width of the vehicle 10 passing the road, which is included in the vehicle information, and provide information indicating the ease of road traffic according to the weight or the vehicle width of the vehicle 10.

The vehicle-mounted device 110 of the second vehicle may transmit the information on the point including the determination result of the determination unit 304 to the vehicle-mounted device 110 of the other vehicle including the information providing unit B 311. Accordingly, the information providing unit B 311 of the vehicle-mounted device 110 in the other vehicle can provide an occupant with the information on the road indicating the ease of road traffic using the determination result such as "passable", "safe lane available", and "deceleration needed" included in the received information on the point.

The functional configuration of the information providing system 1 illustrated in FIGS. 3 and 9 is an example, and the information providing system 1 according to the present disclosure can have various configurations. For example, in FIG. 3, the components included in the vehicle-mounted device 110 may be distributed and provided to a plurality of vehicle-mounted apparatuses. The communication device 120 and the vehicle-mounted device 110 may be realized by one vehicle-mounted device 110. The components included in the server device 100 may be distributed and provided to a plurality of information processing devices.

What is claimed is:

1. An information providing system comprising a central processing unit (CPU), and the CPU is programmed to
   acquire positional information indicating a position where a first vehicle detects a predetermined event on a road and first vehicle information of the first vehicle acquired by the first vehicle at the position, with at least one sensor;
   acquire second vehicle information of a second vehicle at the position;
   determine ease of road traffic at the position as levels using the first vehicle information of the first vehicle and the second vehicle information of the second vehicle at the position; and
   provide the information on the road indicating the ease of the road traffic using a determination result, wherein
   the predetermined event includes a shake of a predetermined value or more detected by the first vehicle;
   the first vehicle information and the second vehicle information include information on a speed and a steering angle of the first vehicle and the second vehicle, and
   the CPU is further programmed to determine the ease of road traffic at the position to be at a first level indicating that safe passage is possible when the predetermined event is not detected in the second vehicle at the position, a difference in a speed between the first vehicle and the second vehicle is smaller than a first threshold value at the position and a difference in a steering angle between the first vehicle and the second vehicle is smaller than a second threshold value at the position, wherein
   the predetermined value is a value that is detected when there is an obstacle comprising a collapse on the road, or an object falling on the road.

2. The information providing system according to claim 1, wherein the CPU is further programmed to
   acquire an image of the position, and
   control a display screen including map information indicating the ease of the road traffic and the image of the position.

3. The information providing system according to claim 1, wherein the CPU is further programmed
   to transmit the information on the position including the second vehicle information at the position and the determination result to an information processing device.

4. The information providing system according to claim 3, wherein the CPU is further programmed
   to acquire an image of the position; and
   the information on the position includes the acquired image of the position.

5. The information providing system according to claim 1, wherein the CPU is further programmed to determine the ease of the road traffic as levels through a comparison between the first vehicle information and the second vehicle information at the position when the predetermined event is not detected in the second vehicle at the position.

6. The information providing system according to claim 1, wherein the CPU is further programmed to determine the ease of road traffic at the position to be at a second level indicating that a safely passable lane is included in the road when the predetermined event is not detected in the second vehicle at the position, a difference in a speed between the first vehicle and the second vehicle is smaller than a first threshold value at the position and a difference in a steering angle between the first vehicle and the second vehicle is equal to or greater than a second threshold value at the position.

7. The information providing system according to claim 1, wherein the CPU is further programmed to determine the ease of road traffic at the position to be at a third level indicating that safe passage is possible through deceleration when the predetermined event is not detected in the second vehicle at the position and a difference in a speed between the first vehicle and the second vehicle is equal to or greater than a first threshold value at the position.

8. The information providing system according to claim 1, wherein the CPU is further programmed to
manage the acquired first vehicle information of the first vehicle and the acquired second vehicle information of the one or more second vehicles, and
determine the ease of the road traffic at the position as levels using the first vehicle information and the managed second vehicle information.

9. The information providing system according to claim 8, wherein
the first vehicle information and the second vehicle information include detection results of the predetermined event; and
the CPU is further programmed to determine the ease of the road traffic at the position to be at a first level when there are vehicles having passed through the position and a vehicle that does not detect the predetermined event is not included among the vehicles having passed the position.

10. The information providing system according to claim 9, wherein the CPU is further programmed to determine the ease of the road traffic at the position to be a second level at which passage is easier than at the first level when a vehicle that does not detect the predetermined event is included among the vehicles having passed the position, and the second vehicle information indicating a steering angle of which a difference from a steering angle of the first vehicle is equal to or greater than a threshold value is included among the second vehicle information.

11. The information providing system according to claim 10, wherein the CPU is further programmed to determine the ease of the road traffic at the position to be a third level at which passage is easier than at the first level and the second level when a vehicle that does not detect the predetermined event is included among the vehicles having passed the position, and the second vehicle information indicating a steering angle of which a difference from a steering angle of the first vehicle is equal to or greater than a threshold value is not included among the second vehicle information.

12. The information providing system according to claim 8, wherein the CPU is further programmed to determine that the road is not passable at the position when the vehicle information of the vehicle having passed the position is not included in the first vehicle information and the managed second vehicle information.

13. A vehicle-mounted device mounted on a vehicle comprising a central processing unit (CPU), and the CPU is programmed to
acquire positional information indicating a position where a first vehicle different from a second vehicle detects a predetermined event on a road and first vehicle information of the first vehicle acquired by the first vehicle at the position;
acquire second vehicle information of the second vehicle at the position;
determine ease of road traffic at the position as levels using the first vehicle information of the first vehicle and the second vehicle information of the second vehicle at the position; and
transmit information on the position including the second vehicle information at the position and a determination result to an information processing device that provides information on the road indicating the ease of the road traffic using the determination result, wherein
the predetermined event includes a shake of a predetermined value or more detected by the first vehicle;
the first vehicle information and the second vehicle information include information on a speed and a steering angle of the first vehicle and the second vehicle, and
the CPU is further programmed to determine the ease of road traffic at the position to be at a first level indicating that safe passage is possible when the predetermined event is not detected in the second vehicle at the position, a difference in a speed between the first vehicle and the second vehicle is smaller than a first threshold value at the position and a difference in a steering angle between the first vehicle and the second vehicle is smaller than a second threshold value at the position, wherein
the predetermined value is a value that is detected when there is an obstacle comprising a collapse on the road, or an object falling on the road.

14. An information providing method comprising:
acquiring, by a computer, positional information indicating a position where a first vehicle detects, with at least one sensor, a predetermined event on a road and first vehicle information of the first vehicle acquired by the first vehicle at the position;
acquiring, by the computer, second vehicle information of a second vehicle at the position;
determining, by the computer, ease of road traffic at the position as levels using the first vehicle information of the first vehicle and the second vehicle information of the second vehicle at the position; and
providing, by the computer, the information on the road indicating the ease of the road traffic using a determination result, wherein
the predetermined event includes a shake of a predetermined value or more detected by the first vehicle;
the first vehicle information and the second vehicle information include information on a speed and a steering angle of the first vehicle and the second vehicle; and
the CPU is further programmed to determine the ease of road traffic at the position to be at a first level indicating that safe passage is possible when the predetermined event is not detected in the second vehicle at the position, a difference in a speed between the first vehicle and the second vehicle is smaller than a first threshold value at the position and a difference in a steering angle between the first vehicle and the second vehicle is smaller than a second threshold value at the position, wherein
the predetermined value is a value that is detected when there is an obstacle comprising a collapse on the road, or an object falling on the road.

* * * * *